United States Patent
Agarwal et al.

(10) Patent No.: US 8,090,703 B1
(45) Date of Patent: Jan. 3, 2012

(54) OVERLAPPING EXPERIMENTS

(75) Inventors: Ashish Agarwal, Sunnyvale, CA (US); Eric Bauer Arbanovella, Boonville, CA (US); Diane Lambert, Berkeley Heights, NJ (US); Ilia Mirkin, New York, NY (US); Michael M. Meyer, Seattle, WA (US); James A. Morrison, San Francisco, CA (US); Daryl Pregibon, Hoboken, NJ (US); Susan Shannon, San Mateo, CA (US); Diane L. Tang, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 260 days.

(21) Appl. No.: 12/367,437

(22) Filed: Feb. 6, 2009

Related U.S. Application Data

(60) Provisional application No. 61/043,352, filed on Apr. 8, 2008.

(51) Int. Cl.
 *G06F 17/30* (2006.01)
(52) U.S. Cl. ........ 707/707; 707/661; 707/706; 707/713; 707/709; 707/711; 707/712; 707/722; 707/736; 707/758; 707/781; 707/791; 707/802

(58) Field of Classification Search .................. 707/661, 707/706, 707, 703, 709, 711, 712, 722, 736, 707/758, 781, 791, 802, 999.003, 999.004, 707/999.005, 999.006, 999.01
See application file for complete search history.

(56) References Cited

U.S. PATENT DOCUMENTS
| | | | |
|---|---|---|---|
| 2006/0212433 A1* | 9/2006 | Stachowiak et al. | 707/3 |
| 2008/0256061 A1* | 10/2008 | Chang et al. | 707/5 |

OTHER PUBLICATIONS

"Microsoft's Experimentation Platform Accelerating software innovation through trustworthy experimentation," retrieved from URL: http://exp-platform.com/default.aspx [[retrieved on Jun. 16, 2011]].
"Microsoft's Experimentation Platform Accelerating software innovation through trustworthy experimentation," retrieved from URL: http://exp-platform.com/hippo.aspx [[retrieved on Jun. 16, 2011]].

* cited by examiner

*Primary Examiner* — Syling Yen
(74) *Attorney, Agent, or Firm* — Fish & Richardson P.C.

(57) ABSTRACT

User queries are received, with each query requesting a service from a server. Overlapping experiments are performed on at least a portion of the queries, with each experiment modifying one or more parameters associated with the queries or parameters associated with processing of the queries, and with the experiments organized into layers. Two or more experiments in different layers are allowed to be performed on the same query, and for any given layer, at most one experiment is allowed to be performed on the same query.

44 Claims, 8 Drawing Sheets

OVERLAPPING EXPERIMENTS

RELATED APPLICATIONS

This application claims priority to U.S. Provisional Patent Application No. 61/043,352, titled "OVERLAPPING EXPERIMENTS" and filed on Apr. 8, 2008. The contents of the above application are incorporated herein by reference.

TECHNICAL FIELD

This document generally relates to information management.

BACKGROUND

Web pages can display information, including articles, images, search results, and/or advertisements (or "ads"). In some examples, websites participate in ad networks that provide ads to be shown on the websites. Publishers of the websites receive credits or payments from the ad networks when visitors to the websites click on the ads or otherwise act on the ads, such as by purchasing products or services being advertised. The percentage of unique visitors who take a desired action upon visiting a website is sometimes referred to as a conversion rate. For example, the desired action may be filling out a form, visiting a predetermined page, completing a transaction or a purchase, downloading a document, or some other measurable action. A number of factors may affect the conversion rate of a website, such as the layout of web pages, placement of content, ads, and navigation elements, and selection of colors, contrast, fonts, and font-sizes. Some websites with web pages that are more attractive to viewers and easier to navigate may have higher conversion rates than websites having cluttered and unattractive web pages.

A publisher of a website may experiment with different configurations of the website using, e.g., A/B testing or multivariate testing. In a conventional A/B testing, two versions of the website that differ in one parameter are displayed to viewers, and statistics on the two versions are gathered and compared. In multivariate testing, multiple parameters are tested simultaneously. By comparing the results of various configurations of the websites, the publisher can determine which configuration may result in the highest conversion rate, leading to the highest ad revenue.

SUMMARY

Overlapping experiments are executed simultaneously on the same set of user queries to increase the total number of experiments that can be run. Overlapping experiments can also increase the number of parameters that can be optimized using a given set of user queries. The experiments are grouped into a nested structure of domains and layers. Some domains, referred to as non-overlapping domains, include a single layer having non-overlapping experiments. Some domains have multiple layers in which the experiments in different layers divert independently and can overlap. The experiments that overlap are referred to as overlapping experiments in the sense that the same traffic can be subject to more than one of the experiments. Some layers are referred to as launch layers that enable gradual launches of features, and can include experiments that are close to being launched. The experiments in the launch layers generate modified parameter values that are used as default values in the other experiments. In some implementations, different experiments in different layers within the same domain can be performed on the same query, but two experiments in the same layer cannot be performed on the same query. Several diversion methods can be used. For example, experiments related to user interfaces can be diverted based on cookie identifiers so that the users have consistent experiences. A cookie identifier can be a bit string that is part of a cookie file stored in a user's computer to provide additional functionality to the user. Search experiments can be diverted according to random or pseudo-random traffic (e.g., by flipping N-sided coins). Diversions can also be based on user identifiers (which are linked to users) or cookie-day identifiers (which combine the cookie identifiers and the dates of the queries). Interactions between parameters can be detected by analyzing the overlapping experiments.

In general, in one aspect, a plurality of user queries are received, with each query requesting a service from a server; and overlapping experiments are performed on at least a portion of the queries, with each experiment modifying zero or more parameters associated with the queries or parameters associated with processing of the queries. The experiments are organized into a plurality of layers. Two or more experiments in different layers are allowed to be performed on the same query. For any given layer, at most one experiment is allowed to be performed on the same query.

Implementations can include one or more of the following features. The queries can be diverted to various experiments at various layers, with some of the queries each being diverted to two or more experiments in different layers in which the diversion of queries in each layer is independent of the diversion of queries in other layers. Some of the experiments can be null experiments. Eligibility conditions associated with the experiments can be used to determine whether to apply the experiments to the queries diverted to the experiments. Parameters are partitioned into various sets of parameters such that different sets of parameters are independent of each other, each set of parameters is associated with a particular layer, and different sets of parameters are associated with different layers. Each experiment can be placed in a particular layer when the experiment modifies a parameter and the parameter is associated with the particular layer. The layers can be grouped into domains, with each domain including one or more layers. The partitioning of parameters in one domain can be independent of partitioning of parameters in another domain. The parameters that can be modified by the experiments can be analyzed to find groups of parameters that are independent of one another, each group of parameters can be associated with an individual layer, and an experiment that modifies a particular parameter can be placed in a layer that is associated with the particular parameter.

A portion of the queries can be diverted to experiments based on at least one of random or pseudo-random traffic, user identifiers associated with the queries, cookie identifiers associated with the queries, or a combination of cookie identifiers and dates associated with the queries. There can be an ordering of diversion schemes, for example, when diverting the queries to the experiments within a given layer, diverting the queries based on user identifiers can be performed before diverting the queries based on cookie identifiers, which can be performed before diverting the queries based on random values. Diverting a portion of the queries to experiments can be based on random traffic, in which a portion of the queries is diverted based on, e.g., outputs of a random number generator or hash values of the queries. A portion of the queries can be diverted to experiments related to user interfaces based on the cookie identifiers associated with the queries. Conditions associated with the queries can be used to restrict the traffic that is diverted to an experiment.

The plurality of layers can include at least one launch layer that includes an experiment associated with a percentage value that is varied over time, the percentage value specifying a percentage of user queries or cookies that are diverted to the experiment. The launch layer can provide at least one alternative default value for a parameter such that if no additional experiment that is not in a launch layer changes the value of the parameter, the alternative default value from the launch layer becomes the default value for the parameter. The plurality of layers can include a plurality of launch layers and a plurality of overlapping layers. Two experiments in different overlapping layers are allowed to be performed on the same query, two experiments in different overlapping layers are not allowed to modify the same parameter, and an experiment in an overlapping layer and another experiment in a launch layer are allowed to modify the same parameter. Parameters associated with the overlapping layers can be partitioned into various sets and associated with different overlapping layers such that a parameter associated with an overlapping layer is independent of another parameter associated with another overlapping layer. Parameters associated with the launch layers can be partitioned into various sets and associated with different launch layers such that a parameter associated with a launch layer is independent of another parameter associated with another launch layer. Each parameter is not associated with more than one overlapping layer, each parameter is not associated with more than one launch layer, and each parameter is allowed to be associated with one launch layer and one overlapping layer. Partitioning of the parameters associated with the overlapping layers can be independent of partitioning of the parameters associated with the launch layers.

The plurality of layers can include layers of experiments that modify parameters related to user interfaces, to ranking of content, to advertisements, to matching of keywords, to maps, to news, to finance, to product search, to a personalized home page, to a non-personalized home page, or to mobile devices. Some of the experiments mentioned above that modify different parameters can be placed in the same layer. For example, experiments that modify parameters related to news and experiments that modify parameters related to mobile devices can be placed in the same layer.

One or more metrics are evaluated to determine the effects of an experiment. The metrics can include at least one of revenue per specified number of impressions, click through rate, a fraction of queries for which one or more ad impressions are served, an average number of ad impressions displayed per query, revenue for ad clicks divided by a number of ad clicks, a number of queries divided by a number of cookies, a number of first page searches divided by a number of cookies, a number of visits divided by a number of cookies, a count of next page queries divided by a number of queries, a number of first page abandoned queries divided by a number of first page queries, a number of abandoned visits divided by a number of visits, a number of queries with at least one click on a search result or ad result divided by a number of queries, a time period between a query and a first click, search click through rate by position, average click position, a number of queries that have at least one ad click divided by a total number of queries, a number of queries that have at least one click on a result divided by a total number of queries (e.g., the result can include an ad or a search result), a number of queries that have at least one click on an organic search result divided by a total number of queries, a number of visits that have at least one click on a result divided by a total number of visits (e.g., the result can include an ad or search result), a number of visits that have at least one search result click divided by a total number of visits, or a number of visits that have at least one ad click divided by a total number of visits. An interaction between experiments in different layers can be detected.

The user queries can include search queries each associated with one or more query keywords, map queries each associated with at least one geographical location, news queries each associated with at least one news event, queries each associated with information on finance, search queries each associated with products, queries each associated with a non-personalized home page, and queries each associated with a personalized home page. The parameters can include groups of parameters related to user interfaces, to ranking of search results, to advertisements, to matching of keywords, to maps, to news, to finance, to product search, to a personalized home page, to a non-personalized home page, or to mobile devices. An analysis of the experiments can be provided to a computing device for display.

In general, in another aspect, a plurality of user queries are received, with each query requesting a service from a server; a data file is received, with the data file defining an experiment structure having a plurality of layers each having at least one experiment, and with at least some of the layers overlapping one another such that the same query is allowed to be assigned to two or more experiments in different overlapping layers; a portion of the queries is diverted to experiments in various layers according to the experiment structure defined by the data file, in which queries are diverted to the experiments in each of the overlapping layers independent of diversion of queries to experiments in other overlapping layers; and the experiments are performed on the queries that have been assigned to the experiments, with each experiment modifying zero or more parameters associated with the queries or parameters associated with processing of the queries.

Implementations can include one or more of the following features. Diverting a portion of the queries to experiments in various layers can include diverting a query to at most one experiment for any given layer. The experiment structure can include nested layers and domains, at least one of the layers including at least one non-overlapping domain and at least one overlapping domain, the non-overlapping domain including experiments that do not overlap one another, and the overlapping domain including at least two overlapping layers. The layers can include at least one launch layer, with the experiments in the launch layer overlapping the experiments in the non-overlapping domain and experiments in the overlapping domain. An experiment in the launch layer can be associated with a percentage value that is varied over time and specifies a percentage of user queries or cookies that are diverted to the experiment. At least one launch layer provides at least one alternative default value for a parameter such that if no additional experiment that is not in a launch layer changes the value of the parameter, the alternative default value from the launch layer becomes the default value for the parameter. The same data file can be received at multiple servers to enable the servers to perform overlapping experiments according to the same experiment structure. Portions of the queries can be diverted at various servers according to the same diversion library that specifies how queries are diverted to the experiments. An analysis of the experiments can be provided to a computing device for display.

In general, in another aspect, messages are received; a portion of the messages are diverted to experiments according to diversion rules, with the experiments being organized in a plurality of layers each having at least one experiment, with at least some of the layers overlapping one another such that the same message is allowed to be assigned to two or more experiments in different overlapping layers and the same message is assigned to at most one experiment for each layer; and overlapping experiments are performed on the portion of the messages diverted to the experiments, with each experiment modifying zero or more parameters associated with the messages or parameters associated with processing of the messages.

Implementations can include one or more of the following features. The messages can include user queries, with each query requesting a service from a server. One or more metrics can be evaluated to determine the effects of an experiment. For each overlapping layer, a portion of the messages is diverted to an experiment in each layer independent of diverting a portion of the messages to experiments in other overlapping layers. An analysis of the experiments is provided to a computing device for display.

In general, in another aspect, experiments are assigned to a launch domain, a non-overlapping domain, or an overlapping domain, with each experiment modifying zero or more parameters associated with user queries or parameters associated with processing of the user queries. For experiments in the non-overlapping domain, only one experiment is allowed to be performed on a query. For experiments in the overlapping domain, the experiments are assigned to a plurality of layers, two or more experiments in different layers are allowed to be performed on the same query, and within a given layer only one experiment is allowed to be performed on a query. Experiments in the launch domain are performed and may overlap experiments in both the overlapping domain and the non-overlapping domain.

Implementations can include one or more of the following features. For example, an experiment in the launch domain can be associated with a percentage value that is varied over time, with the percentage value specifying a percentage of user queries (or cookies, for cookie based diversion) that are diverted to the experiment. An experiment in the overlapping domain can be associated with a percentage value that is varied over time, with the percentage value specifying a percentage of user queries that are diverted to the experiment. An experiment in the non-overlapping domain can be associated with a percentage value that is varied over time, with the percentage value specifying a percentage of user queries that are diverted to the experiment. Experiments in the overlapping or non-overlapping domain are allowed to modify parameters that have been modified by the experiments in the launch layer.

In general, in another aspect, search queries are received; overlapping experiments are performed on at least a portion of the search queries, with each experiment modifying zero or more parameters associated with the search queries or parameters associated with processing of the search queries; two or more experiments that modify different parameters are allowed to be performed on the same search query; and, for each set of experiments that modify the same parameter, only one of the experiments in the set is permitted to be performed on a search query.

Implementations can include one or more of the following features. One or more metrics can be evaluated to determine the effects of an experiment. The parameters can include at least one of groups of parameters related to user interfaces, to ranking of search results, to advertisements, to matching of keywords, to maps, to news, or to mobile devices. The search queries can be diverted to a first experiment independent of diverting the search queries to a second experiment when the first and second experiments are allowed to overlap and be performed on the same search query.

In general, in another aspect, a memory stores a diversion library that specifies diversion rules for diverting a portion of user queries to experiments, with each experiment modifying zero or more parameters associated with the queries or parameters associated with processing of the queries, and a data file specifying an experiment structure in which the experiments are organized in a plurality of layers each having at least one experiment, at least some of the layers overlapping one another such that the same query is allowed to be assigned to two or more experiments in different overlapping layers, and the same query is assigned to at most one experiment for each layer. A data processor receives user queries, diverts a portion of the user queries to overlapping experiments based on the diversion library and the data file, and performs the overlapping experiments on the user queries assigned to the experiments.

Implementations can include one or more of the following features. The data processor can divert a portion of the queries to the experiments based on random or pseudo-random traffic or cookie identifiers associated with the queries. The data processor can evaluate one or more metrics to determine the effects of an experiment.

In general, in another aspect, a web server receives user queries, with each query requesting a service from the web server; and a diversion engine diverts the user queries to experiments, with each experiment modifying zero or more parameters associated with the queries or parameters associated with processing of the queries. The experiments are divided into layers, and the diversion engine is designed to allow the same query to be diverted to different experiments in different layers and to prevent the same query from being diverted to different experiments in the same layer.

Implementations can include one or more of the following features. The diversion engine can divert the queries to the experiments based on at least one of random traffic or cookie identifiers associated with the queries. The diversion engine can divert the queries to various experiments at various layers, each layer using a diversion process that is orthogonal of the diversion processes of the other layers, with some queries being diverted to two or more experiments in different layers. An analyzer can evaluate one or more metrics to determine the effects of an experiment. The metric can include revenue per specified number of impressions, click through rate, coverage, or ad depth. A configuration file can define experiment layers and specify which experiments are associated with which layers.

In general, in another aspect, an apparatus includes a storage storing a data file defining an experiment structure having experiments that are organized in a plurality of layers; and means for receiving a plurality of user queries, with each query requesting a service from a server, and performing overlapping experiments on at least a portion of the queries, with each experiment modifying zero or more parameters associated with the queries or parameters associated with processing of the queries. Two or more experiments in different layers are allowed to be performed on the same query, and, for any given layer, at most one experiment in the layer is performed on the same query.

In general, in another aspect, a computer-readable medium has computer-executable instructions that, when executed by a computer, cause the computer to receive a plurality of user queries, with each query requesting a service from a server; and to perform overlapping experiments on at least a portion of the queries, with each experiment modifying zero or more parameters associated with the queries or parameters associated with processing of the queries, in which the experiments are organized in a plurality of layers. Two or more experiments in different layers are allowed to be performed on a same query, and, for any given layer, at most one experiment is allowed to be performed on the same query.

These and other aspects and features, and combinations of them, may be expressed as methods, apparatus, systems, means for performing functions, program products, and in other ways.

Advantages of the aspects and features include one or more of the following advantages. Performing overlapping experiments can increase the total number of experiments that can be run for a given set of user queries. Using launch experiments allows ramping up launches of new features, allowing users to gradually see changes in features, resulting in a smoother transition in user experience. Launch experiments also allow load testing to be performed to make sure the new features are compatible with other existing features. Testing of new features of new products can be performed conveniently. Faster and automatic adjustments of different serving thresholds may be easier with overlapping experiments. Overlapping experiments are efficient for testing interactions among parameters of the system. Overlapping experiments provide a way to start and stop multiple experiments independently of each other, so the experiments may overlap in time but do not have to begin and end simultaneously. Different parts of an organization that is running a system can perform tests on the system independently of each other, without coordinating test plans.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

An experiment system can be configured to enable overlapping experiments to be executed on a given set of queries to increase the total number of experiments that can be run, and to increase the number of parameters that can be optimized using the given set of queries, as compared to executing experiments that do not overlap. The system can provide a number of diversion methods that specify how the queries are diverted to experiments. Optionally, each experiment can be associated with eligibility conditions such that among the queries diverted to the experiments, only queries that meet the eligibility conditions are subject to experimentation.

Figure 1:
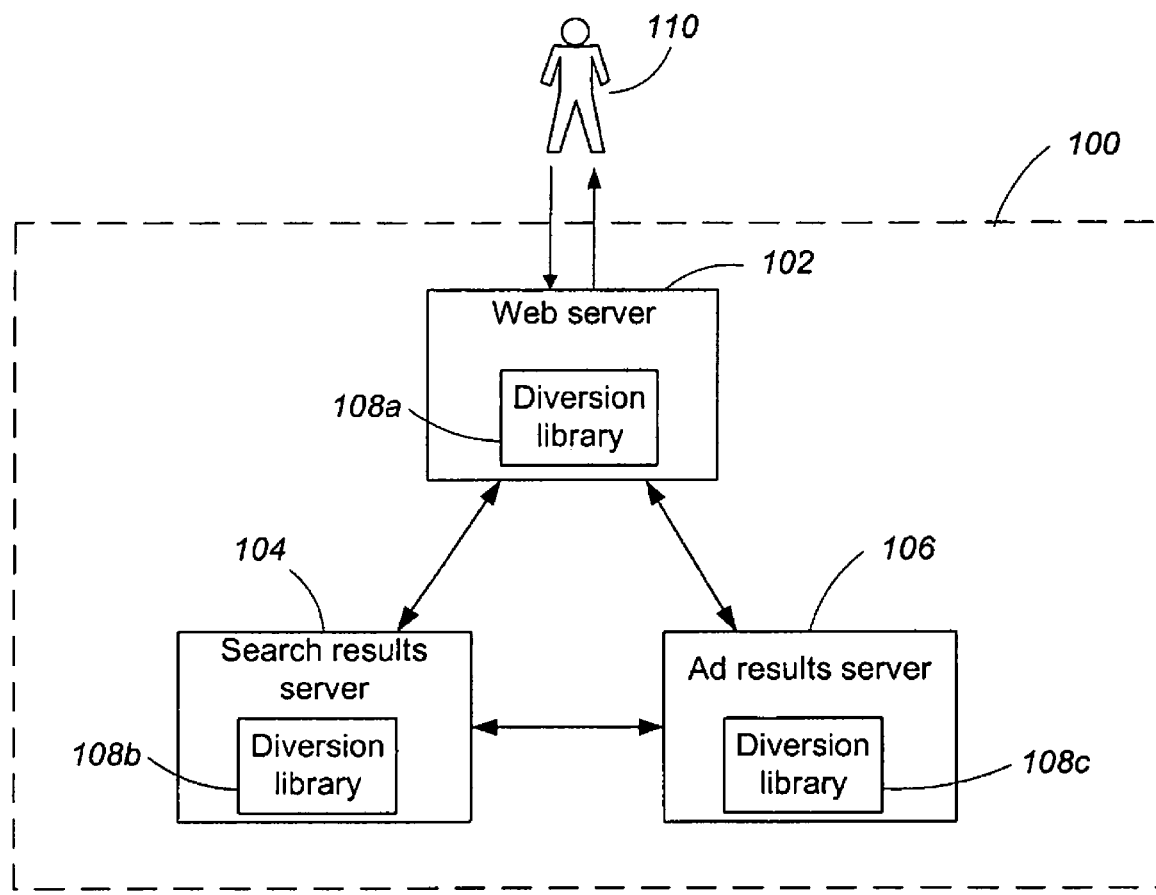
FIG. 1 is a schematic diagram of an example system for performing overlapping experiments.

Referring to FIG. 1, an example experiment system 100 for performing overlapping experiments includes a web server 102 that is coupled to a search results server 104 and an ad results server 106. The web server 102 receives user queries (e.g., search queries) from users 110 and sends responses (e.g., search results and sponsored content) to the users 110. The web server 102 forwards the search queries to the search results server 104 and the ad results server 106. The search results server 104 returns the search results to the web sever 102. The ad results server 106 identifies sponsored content (e.g., ads) relevant to the search queries. In some implementations, the search results server 104 sends the search results to the ad results server 106, and the selection of ads is also based on the search results. The ad results server 106 sends the sponsored content to the web server 102. The web server 102 formats and sends the search results along with the sponsored content to the users 110. Experiments can be conducted at the web server 102, the search results server 104, and the ad results server 106 to adjust various parameters and evaluate the effects of the adjustments.

The effects of adjustments made by various experiments can be compared with results from control experiments. In some examples, the system 100 assigns default values to many parameters. An experiment that overrides no experiment flags can be considered to be a control experiment. The system 100 can also run control experiments in which particular values are assigned to particular parameters, and the results of other experiments that adjust the parameter values are compared against the results of the control experiments. It is also possible to run experiments without comparing to a default.

A diversion library 108 specifies how traffic (e.g., search queries) is diverted to various experiments. Some of the experiments are performed in parallel, referred to as overlapping experiments. The same queries are independently diverted to different overlapping experiments. Performing overlapping experiments increases the total number of experiments that can be run for a given set of user queries, compared to a system that assigns each user query to only one experiment.

Each of the web server 102, the search results server 104, and the ad results server 106 executes application programs (also referred to as binary files or executable programs, and sometimes simply referred to as "binaries") for implementing various functions. The application programs executing at the servers 102, 104, and 106 can be linked to the diversion library 108. When a new application program for implementing a new service is added to the system 100, the new application program is linked to the diversion library 108 so that overlapping experiments can be performed on the new service. As a result, the system 100 can be easily expanded to allow overlapping experiments to be performed for additional application programs that implement additional functions, e.g., binaries that provide news, maps, or mobile services. For example, a binary can provide financial information and allow users to search for information on stocks, mutual funds, and public and private companies, a binary can provide product search services (e.g., presenting photographs and information on products and links to the stores that sell them), and another binary can enable users to personalize home pages with various information (e.g., news, weather, photos, or stock prices).

In this description, performing overlapping experiments on user queries means that multiple experiments are performed on the same user query or the same set of user queries. For example, a search query may be processed by the web server 102 (which receives the search query and returns a response to the sender of the search query), the search results server 104 (which performs a search according to the search query), and the ad results server 106 (which identifies ads relevant to the search results). The search query may be diverted to a first experiment at the web server 102, a second experiment at the search results server 104, and a third experiment at the ad results server 106. The first, second, and third experiments are considered to be overlapping experiments because they are all associated with the same search query. It is also possible to divert the query to multiple overlapping experiments that are conducted in one server.

One of the reasons for using an overlapping experiment model is that there may not be enough experiment space for running an ever-increasing number of experiments. When a large number of experiments are run on a limited number of queries, it may not be possible to run all of the experiments in a disjoint manner. Some experiments have restrictive eligibility conditions, such as user identifiers or HTML interface language. The user identifiers are identifiers that are linked to the users 110, such as identifiers provided to the users 110 when the users 110 sign up for services. Diverting queries to such experiments early on may bias the distribution of traffic seen by all experiments downstream, potentially affecting the quality of the results of the downstream experiments. Since many experiments are independent, it may not be necessary to keep them disjoint, such that the experiments can overlap with one another. In some cases, overlapping the supposedly independent experiments may reveal interactions among the experiments.

When multiple experiments are performed on the same query, information about the queries can be shared among the experiments. For example, different experiments can share a cookie file associated with the same query on which the experiments are run.

In some implementations, an experiment is associated with a set of diversion rules, eligibility conditions, and experiment parameters. The diversion rules define which queries are diverted to an experiment, the eligibility conditions provides limitations for selecting which of the diverted queries are actually subject to the experiment, and the experiment parameters define what to do when the experiment runs. The diversion rules may include a query fraction that defines the proportion of the eligible traffic that should be diverted into the experiment. Eligibility conditions can be tested against properties of each of the queries diverted to the experiment, such as a specific web property or a hash of a query string, in order to restrict the queries on which the experiment is run. Experiment parameters are parameters whose values are specified by the experiment. For example, an experiment can change the threshold at which ads are promoted above search results by setting the "promotion_theshold" parameter to a new value.

In some implementations, experiments are defined by data files having structured data, e.g., data files containing protocol messages in ASCII format. The files are pushed to various components of the system 100, such as the web server 102, the search results server 104, and the ad results server 106. Upon receiving the data files, the servers start diverting appropriate amounts of traffic to each experiment listed in the data files. The data files are written in a language or protocol that can be understood by various components of the system 100 so that the data files can be shared, e.g., among the web server 102, the search results server 104, and the ad results server 106. This enables coordination among the servers for conducting experiments.

An experiment can be configured with the following information:
  A unique identifier.
  Basic information, e.g., the name of the experiment, the owner of the experiment, and a brief description.
  Logistical information, e.g., the identifier of the control experiment (if this experiment is a control, then the control experiment identifier references to itself), whether the experiment id active or not, what group the experiment is in (to group together all the variants that should be compared together), the start date of the experiment, and the end date of the experiment.
  Diversion information, including what layer the experiment belongs to (each layer has a unique name), which diversion point to use, what type of diversion to use (user ID, cookie, cookie day, or random traffic), and any filter hooks (e.g., which network domains, properties, languages, etc., that the experiment should run on). If the diversion type is not random traffic, then zero or more mod values can be specified (numbers between, e.g., 0 to 999), to indicate which bucket(s) of user ID's, cookies, or cookie-days that the experiment should run on. For random traffic experiments, a fraction of traffic is specified, for example, a 0.01 fraction corresponds to a 1% random traffic experiment.
  Flag information: For each experiment flag that the experiment wants to override, the experiment specifies the flag and the value that should be used in the experiment instead of the default value. Unspecified flags use the default values.

An experiment configured by the data files can be triggered for a query at one of the many predefined diversion points in the query processing chain for subscribing servers (i.e., servers that subscribe to the data files). Each server can have one or more diversion points. Within each binary, there may be zero or more diversion points. At each diversion point, the binary may decide to divert the query to zero or more experiments. For example, a given query can divert into experiments in a front end load balancing server (not shown in the figure), or at the start of processing in an ad-mixer (not shown), or at the end of processing in the ad-mixer. Many diversion points are used because some eligibility conditions are computable at or after specific points, e.g., experiments for specific advertisers may not be diverted before the ad-mixer has received candidate ads.

For example, at the beginning of processing a query, a binary may only know that there is a query and, for example, what network domain the query is from (e.g., google.com vs. google.de) and which computer server in which datacenter is handling the query. In the middle of handling a query, the binary may also, for example, have information about what language the query is in. At the end of handling the query, the binary may know, e.g., whether or not a map is showing on the page. This information is useful because each binary supports zero or more eligibility conditions or filter hooks that define, given the information, what type of filter to apply for an experiment (e.g., restrict to only queries from google.de, restrict to only German queries, or restrict to only queries that show a map).

There are several ways to divert traffic. The diversions can be classified into various diversion types, which indicate the major conditions used during diversion. Examples of diversion types include user identifier, cookie, cookie-day, random traffic, query hash, and advertiser. There are additional ways of specifying diversion types, e.g., by using web properties, traffic pools, country, and languages. In addition, eligibility conditions can be used to restrict the traffic diverted to experiments, and different experiments may have different eligibility conditions. Examples of eligibility conditions include, e.g., web properties, countries, network domains, and other filter hooks.

In FIG. 1, the reference number 108*a* refers to the diversion library linked to the binary in the web server 102, the reference number 108*b* refers to the diversion library linked to the binary in search results server 104, and the reference number 108*c* refers to the diversion library linked to the binary in the ad results server 106. The diversion libraries 108a, 108b, and 108c are configured with the same data files that are pushed to the servers 102, 104, and 106.

The following is a description of an example process for handling user search queries and performing experiments on the user search queries. While this description mostly focuses on performing experiments on user search queries, experiments can also be performed on other types of user requests, such as when users 110 access e-mail services or multimedia distribution services (e.g., personal photo or video sharing services).

A user 110 sends a search query over a network (not shown, which can be, e.g., the Internet or any other network) to the web server 102. The web server 102 diverts the search query to zero or more experiments being run at the web server 102. The web server 102 sends the query to the search results server 104 and the ad results server 106. The search results server 104 diverts the search query to zero or more experiments being run at the search results server 104. The search results server 104 performs a search and returns the search results to the web server 102. The ad results server 106 diverts the search query to zero or more experiments being run at the ad results server 106. The ad results server 106 selects ads that are relevant to the query. In some implementations, the search results server 104 sends the search results to the ad results server 106, and the selection of ads is also based on the search results. The ad results server 106 sends the ads to the web server 102. The web server 102 delivers the search results and the ads to the user 110.

As the example above shows, the search queries can be diverted to experiments at various diversion points in the system 100. When a search query is diverted to an experiment, the search query is processed to change zero or more parameters according to the experiment. For example, the layout of web pages, placement of content, ads, and navigation elements, and selection of colors, contrast, fonts, font-sizes, and formats of user feedback mechanisms can be subject to experimentation. When parameters of a user interface are subject to experimentation, different diversion points can affect different aspects of the user interface.

Experiments that do not change parameters can be used as control experiments (i.e., baselines). Such experiments can also be used to run uniformity trials (e.g., compare results from several experiments that do not change parameters) and establish the inherent variability of the system. These experiments are subject to the same diversion rules, eligibility conditions, and metrics as experiments that do change parameter values.

In some implementations, at each diversion point, cookie identifiers and the search queries are examined to determine whether a search query should be diverted to one of the experiments that are being run on the system 100. A cookie identifier can be a bit string that is part of a cookie file stored in a user's computer to provide additional functionality to the user 110. For example, the cookie file can store information for user preferences or past search histories assuming, for example, the user 110 has agreed or opted in to this kind of storage. The cookie file may allow the system 100 to provide recommendations to the user 110 based on the user's preferences or past behavior (e.g., past browsing history). In some implementations, the system 100 preferably protects privacy of users 110 by not causing personally identifiable information to be stored in the cookie identifiers, and by obfuscation of individually identifying information or other personal information when performing the experiments, or through other privacy protecting mechanisms. Notices of privacy policies can be provided to users 110 to inform the users 110 about what information is collected, how the information is used or how the user 110 may opt out.

Several methods can be used to determine whether a search query should be diverted to an experiment. For example, for experiments related to user interfaces, the search queries can be diverted based on cookie identifiers so that the users 110 have consistent experiences. Queries associated with the same cookie identifier are diverted consistently to the same experiments over a period of time so that the parameters changed by the experiments are changed consistently. Such experiments are referred to as random cookie experiments, or simply cookie experiments.

For experiments related to searches, the search queries can be diverted according to random traffic (e.g., by using a random number generator), and such experiments are referred to as random traffic experiments. Other diversion schemes can also be used. For queries that are diverted to an experiment based on a particular diversion scheme, filter hooks or eligibility conditions (e.g., browser type) can be used to further restrict the traffic that is subject to an experiment. Different experiments can be associated with different filter hooks or eligibility conditions.

In this description, when a search query is said to be "diverted" to an experiment, it means that an experiment is applied to the search query to modify some parameter values. The parameters values being modified by an experiment may or may not be related to how the search query is processed. For example, a first experiment may adjust how searching is performed, while a second experiment may adjust the background color of top ads that are returned to the user 110 along with the search results. In the latter example, the search query diverted to the second experiment is still processed in a manner similar to the search queries not subject to the second experiment, just that the background color of the top ads is changed from the default value.

In some examples, a modulo operation is performed on a cookie identifier associated with a search query, and the remainder is used to assign the search query to experiments. For example, a cookie identifier can be a 64 bit string, and assuming there are less than 1000 experiments, the experiments to which the search query is assigned can be determined using the formula:

$$\text{Experiment number} = \text{Cookie ID MOD}(1000).$$

For example, if cookie ID MOD (1000)=42, then the search query is sent to the cookie experiment that corresponds to 42. If the remainder is not associated with any cookie experiment, then the search query can be used in a random traffic experiment. Suppose there are less than 1000 random traffic experiments, a random number (or pseudo-random number) generator can be used to generate a random number between 1 to 1000, and the search query is diverted to the random traffic experiment that is associated with the random number. If the random number is not associated with any random traffic experiment, then the search query is not in any experiment and is processed using default values. The process of deciding whether the search query belongs to a cookie experiment or a random traffic experiment can be performed at every diversion point.

In some implementations, the same cookie ID MOD number can be associated with more than one experiment. For example, suppose the formula for calculating the experiment number is the same as the example above, namely, experiment number=cookie ID MOD (1000). The number of experiments can be larger than 1000 if different experiments are configured to use different traffic, such as traffic of different languages. For example, a first experiment that uses traffic in the English language and a second experiment that uses traffic in the Korean language can both be associated with the same cookie ID MOD number. For example, if cookie ID MOD (1000)=42 and the search query is in English, the search query is diverted to the first experiment, whereas if cookie ID MOD (1000)=42 and the search query is in Korean, the search query is diverted to the second experiment.

Similarly, for random traffic experiments, the same random number can be associated with different experiments when the different experiments use different traffic. For example, if the random number=37 and the search query is written in Chinese, the search query is diverted to a first experiment, and if the random number=37 and the query is written in German, the search query is diverted to a second experiment.

Cookie experiments are different from random traffic experiments. In some implementations, when performing experiments related to user interfaces, it is preferable to provide users 110 with consistent experiences, so cookie identifiers are used to divert search queries from the same user 110 to the same experiments for a certain period of time so that the user 110 sees a consistent user interface. Providing a consistent user interface may include, e.g., providing the same background color, font or layout. When performing a user interface experiment, an experiment may test whether the user behavior will change over time when the user 110 is given a particular configuration of the user interface. If the user is provided with inconsistent user interface configurations, it may be difficult to gather any useful data.

In some implementations, a cookie identifier is associated with a computer or a web browser and not directly associated with a user. For example, the same user may use multiple computers or browsers and be associated with multiple cookie identifiers. However, for a large percentage of the total traffic, the same cookie identifier is associated with the same user, so there is a high likelihood that the users will see consistent user interfaces if the experiments for adjusting parameters of the user interface are diverted based on cookie identifiers.

From the perspective of the experiments, the diversion schemes are used to select queries that are subject to experimentation. From the perspective of the queries, the diversion schemes are used to select experiments. Diversion schemes based on cookie identifiers can be used to select experiments for a given user. For example, if we want a user whose cookie ID mod number equals a certain value to see a user interface having certain features, we can devise cookie experiments to provide the certain features and specify that only queries whose cookie ID mod numbers equal a certain value are subject to the experiments.

If the experiments are related to how search results or ads are ranked, in some implementations it may be more appropriate to perform random traffic experiments so that search queries are randomly assigned without regard to which user 110 is submitting the search query. In a ranking experiment, the user 110 may not detect any changes because the parameters being adjusted in the experiment are used in the background processing and may not be noticed by the user 110. However, in such cases, cookie experiments can still be used in order to obtain experiment results based on cookie- or visit-based metrics.

Filter hooks can be used restrict traffic that is diverted according to a particular diversion scheme (e.g., cookie based or random traffic). For example, a search query can be diverted to an experiment if something specific about the query is true. For example, a search query may be diverted to an experiment if a particular ad or result shows up, or if the query has a particular ad configuration. For example, a filter may pass only search queries from a particular search web site, user queries processed by a particular data center, user queries that are in a particular language or a particular network domain (e.g., google.com versus google.com.uk), or queries having a particular property (e.g., map queries versus news queries).

Some experiments can divert search queries based on user identifiers, which are identifiers associated with users. Such identifiers can be obtained, for example, when users log in to services that the users have previously registered and provided identifying information. Experiments that divert traffic based on user identifiers can follow users to different machines. This is useful for experiments that are tied to user behavior across multiple computers. This is slightly different from cookies, which are typically associated with individual computers or browsers. Notices of privacy policies can be provided to users to inform the users about what information is collected and how the information is used when the users log on the services.

Other methods of diverting traffic may also be used.

In some implementations, the system 100 organizes the experiments in experiment layers and experiment domains (simply referred to as layers and domains), which are specified in data files used by the diversion library. The data files can be easily modified to change the configurations of the layers and domains. The data files can be pushed to subscribing servers (e.g., 102, 104, and 106), which start diverting queries to experiments according to the diversion rules specified in the data files.

Note that the term "domain", when used in the context of organizing experiments, refers to a container of domains and layers, and is different from a network domain (e.g., google.com or google.com.uk).

The layers have the following properties: any two experiments in different layers divert independently of each other, and any two experiments within the same layer cannot be performed on the same query (i.e., do not overlap each other). Different experiments in different layers can be performed on the same query.

In some examples, when two experiments that are designed to be diverted independently of each other are placed in different layers, and there is interaction between experiments, it may be possible to detect such interactions. For example, when the parameters for experiment 1 and the parameters for experiment 2 are changed together, it may produce a effect that is different (beyond additive) from changing the parameters for each experiment independently. When we say two experiments interact, we mean that when both experiments are performed together, the total effect from both experiments cannot be predicted from their separate effects (e.g., the effects from the two experiments are non-additive). Detecting such interactions may allow a person conducting the experiments to make a more informed decision regarding the effects of the experiments. One can also adjust which flags are assigned to which layers so that the interacting experiments are in the same layer (since only one experiment in a given layer can be applied to a query, the interacting experiments will no longer be applied to the same query). The flags for experiments are described later.

Figure 2A:
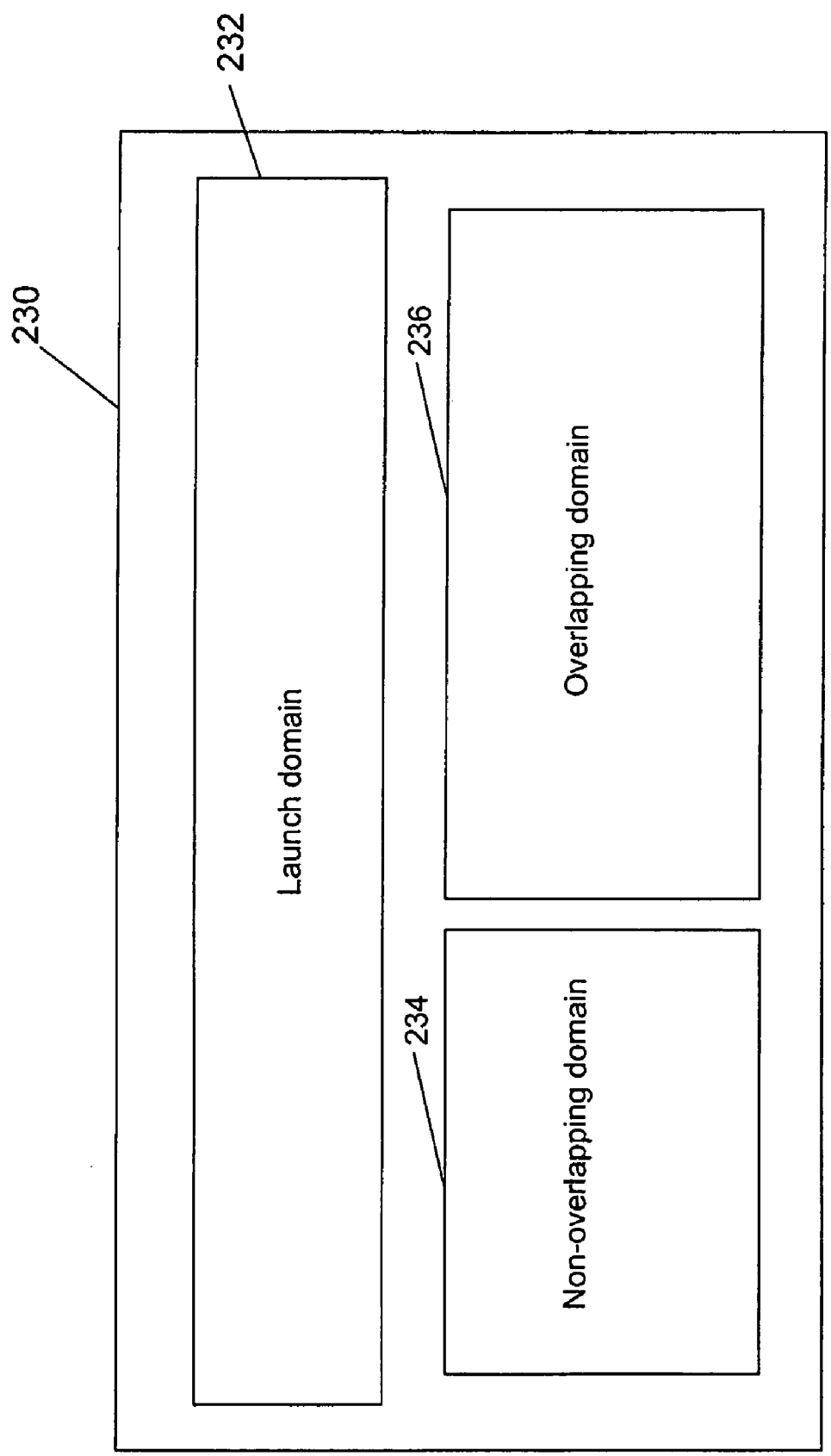
FIGS. 2A, 2B, 2C, and 3 are diagrams representing examples of various domains and layers associated with experiments.

FIG. 2A is a diagram representing a simple example of how experiments can be organized in various domains, each domain having one or more layers of experiments. The experiment space 230 can be organized into a launch domain 232, a non-overlapping domain 234, and an overlapping domain 236, in which the launch domain 232 overlaps the non-overlapping domain 234 and the overlapping domain 236. The launch domain 230 can include one or more layers of launch experiments. The non-overlapping domain 234 includes one layer of non-overlapping experiments. The overlapping domain 236 can include one or more layers of overlapping experiments.

For each query allocated to a domain, the system 100 determines whether there is an experiment in each layer in the domain that can be applied to the query. Each query is subject to zero or more experiments in each of the layers. In this example, the total traffic is subject to the launch domain, i.e., all of the user queries are tested to see if any user queries should be diverted to any of the experiments in the launch domain. The total traffic is also divided between the non-overlapping domain 234 and the overlapping domain 236. Thus, a portion of the total traffic is subject to the non-overlapping domain 234, and the remaining portion of the total traffic is subject to the overlapping domain 236.

For every query allocated to the launch domain 232, the system 100 determines whether the query should be diverted to zero or one of the experiments in each of the layers in the launch domain 232. For each query allocated to the non-overlapping domain 234, the system 100 determines whether the query should be diverted to zero or one of the non-overlapping experiments in the non-overlapping domain 234. For every query allocated to the overlapping domain 236, the system 100 determines whether the query should be diverted to zero or one of the experiments in each of the layers in the overlapping domain 236.

For example, if a first experiment assigns the background color of a top ad to red, a second experiment assigns the background color of the top ad to green, and a third experiment assigns the background color of the top ad to blue, these three experiments should not overlap since they adjust the same parameter. These three experiments can be placed in the non-overlapping domain 234. Alternatively, the three experiments can be placed in the same layer in the overlapping domain 236 (if each of the three experiments can overlap with experiments in the other layers of the overlapping domain 236). For example, if a fourth experiment adjusts the color of a user interface element, a fifth experiment adjusts the page template for a search results page, and a sixth experiment adjusts the formatting of a search results page company logo, the fourth to sixth experiments can overlap since they adjust different parameters that are independent from each other. The fourth to sixth experiments can be placed in the overlapping domain 236. For example, the launch domain 232 can include experiments that adjust parameter values for gradual ramp up, discussed in more detail below.

There can be various ways of organizing the experiments. For example, there can be zero non-overlapping domain and one or more overlapping domains. There can be one or more non-overlapping domains and two or more overlapping domains, etc. For example, there can be separate domains for particular types of queries, such as queries coming from particular countries or queries in particular languages. If there are multiple overlapping domains, the layers in one overlapping domain can have a partitioning of experiment parameters that is different from that in the other overlapping domains.

Figure 2B:
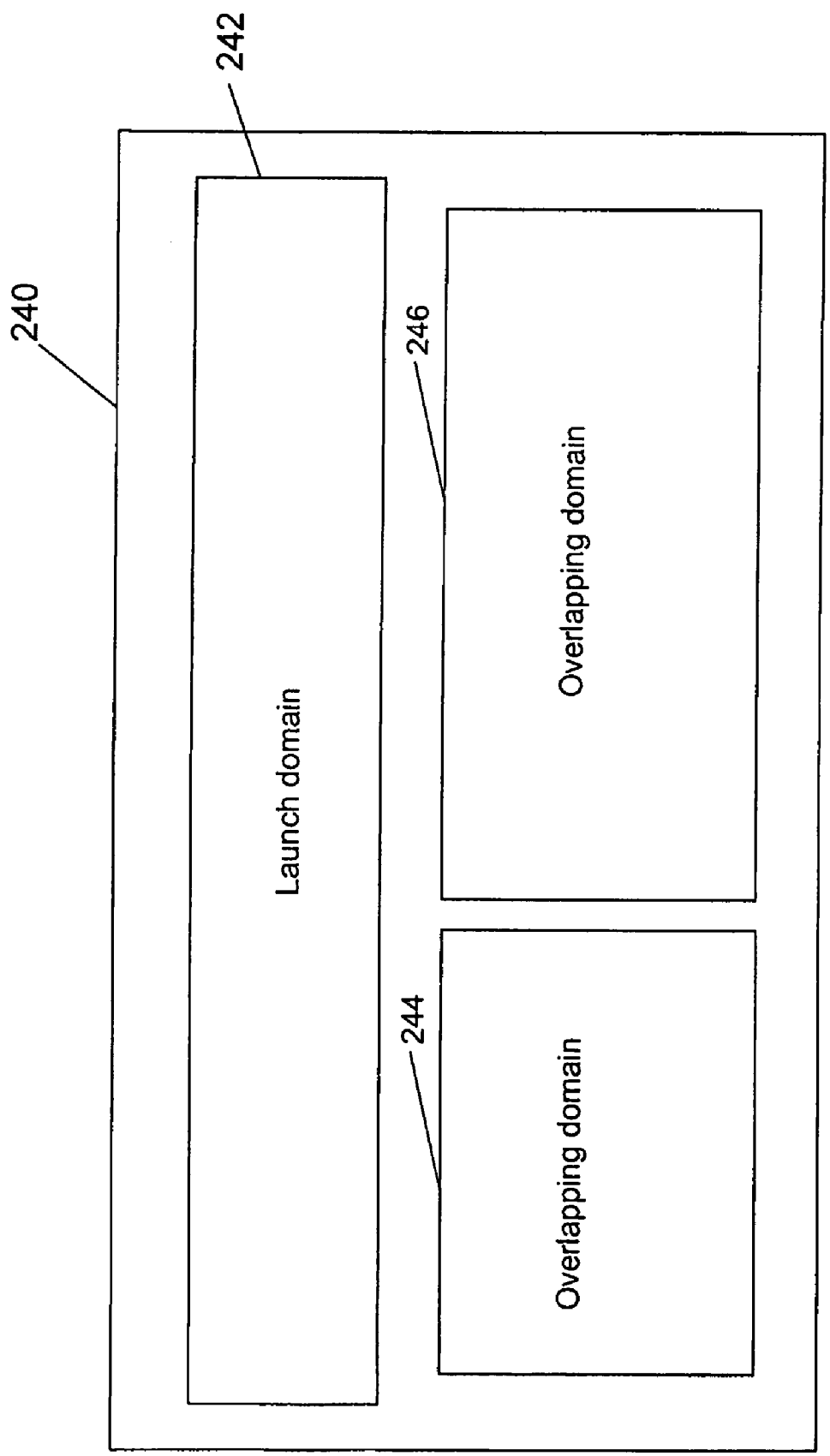

Referring to FIG. 2B, an experiment space 240 can be organized into a launch domain 242, a first overlapping domain 244, and a second overlapping domain 246, in which the launch domain 242 overlaps the first and second overlapping domains 244 and 246. Each of the overlapping domains 244 and 246 can include one or more layers of overlapping experiments. For example, the first overlapping domain 244 can have experiment flags that are partitioned to form a set of flags related to user-interfaces and a set of flags related to ranking. The first overlapping domain 244 can include a layer having experiments that modify parameters related to user-interfaces and another layer having experiments that modify parameters related to ranking. The second overlapping domain 246 can have experiment flags that are partitioned to form a set of flags related to searches and a set of flags related to ads. The second overlapping domain 246 can include a layer having experiments that modify parameters related to searches and another layer having experiments that modify parameters related to ads.

In some implementations, two overlapping domains (e.g., 244 and 246) can be allocated a disjoint set of traffic (i.e., the traffic sent to the domain 244 does not overlap the traffic sent to the domain 246). In this case, the experiments in the domain 244 and the experiments in the domain 246 can modify the same parameter. For example, the first overlapping domain 244 can receive queries in the English language, and the second overlapping domain 246 can receive queries in non-English languages. An experiment E1 in the first overlapping domain 244 may modify parameters related to searches, and an experiment E2 in the second overlapping domain 246 may modify the same parameters related to searches. Because the experiments E1 and E2 operate on different queries, the experiments E1 and E2 would not interfere with each other. Also, since the traffic sent to the domain 244 is different from the traffic sent to the domain 246, how traffic is diverted to the various overlapping layers in the first domain 244 has no effect on how traffic is diverted to the various overlapping layers in the second domain 246, and vice versa.

Organizing the experiments into multiple overlapping domains provides more flexibility in arranging the experiments compared to just having one overlapping domain. Different domains can have different partitioning of the flags and may allow a greater variety of experiments to be performed. For example, an experiment that modifies multiple flags can be placed in a domain having a layer associated with the multiple flags, and such layer may not exist if only one overlapping domain is used.

For example, the experiments can be organized in a nested structure of layers and domains in which each layer can include one or more domains, and each domain can include one or more layers, and so forth. Each layer can have zero or more experiments. The organization of the experiments into layers and domains can be dynamic, so that depending on the number or types of experiments being conducted during a particular time period, some domains can be added or removed as needed. For example, the system 100 enables launch layers but does not require launch layers to be used (i.e., there can be zero launch layers).

Figure 2C:
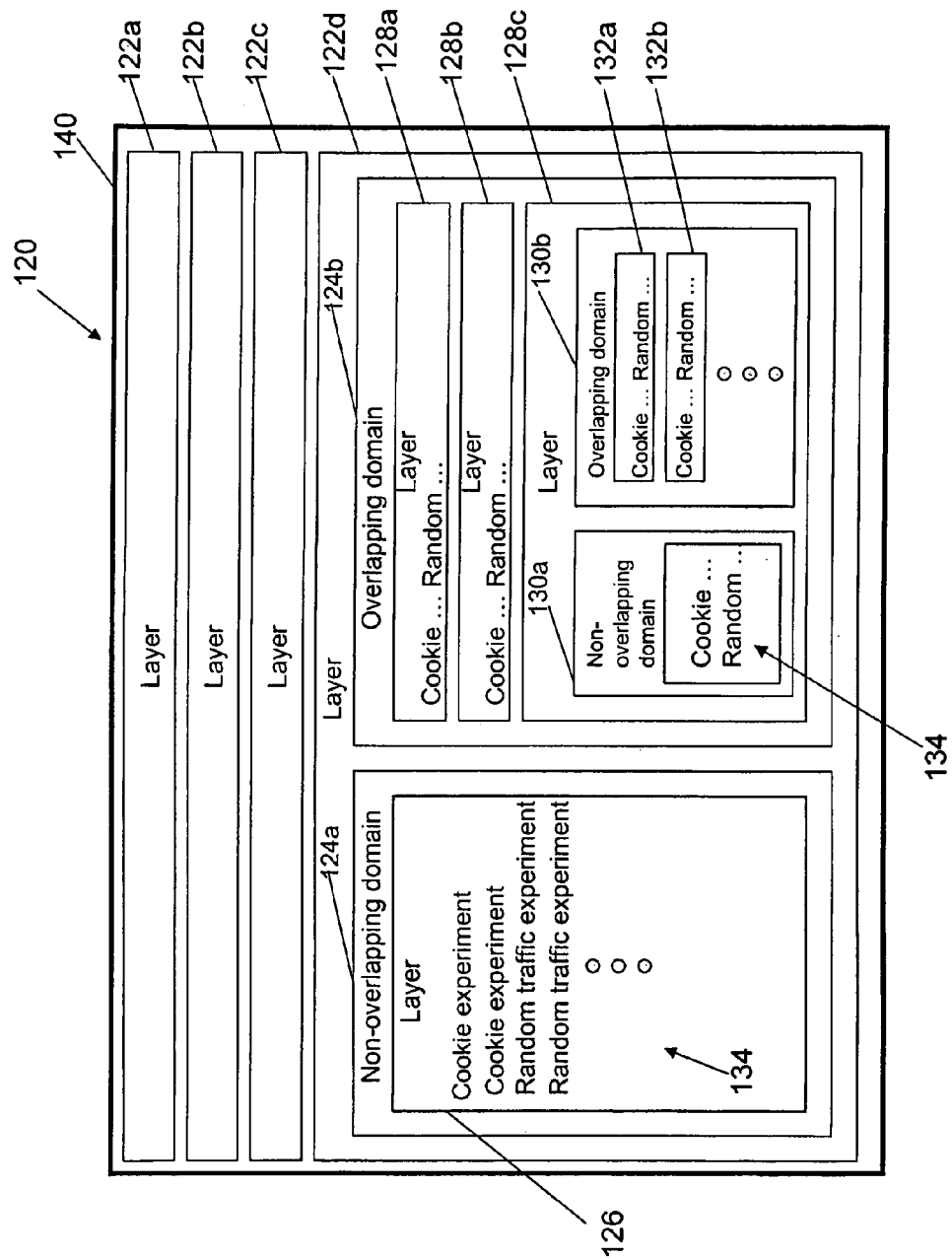

FIG. 2C is a diagram 120 representing an example of how experiments can be organized in a nested structure of layers and domains. Each layer can have one, two, or more domains. For example, a layer can have a non-overlapping domain and an overlapping domain. A layer can also have other domains, such as a domain for traffic that is specific to a particular country. The non-overlapping domain includes non-overlapping experiments, whereas the overlapping domain includes overlapping experiments. The overlapping domain can further include nested layers and domains, in which each layer can have one, two, or more domains, and so forth.

In the example of FIG. 2C, the entire experiment space can be considered to be a default domain 140, which includes four layers 122a to 122d. Each of the first three layers 122a to 122c has zero or more experiments within the layer, and the fourth layer 122d has two domains, a non-overlapping domain 124a and an overlapping domain 124b. The non-overlapping domain 124a has one layer 126 that includes non-overlapping experiments. The overlapping domain 124b includes layers 128a, 128b, and 128c. The layer 128c in turn has a non-overlapping domain 130a and an overlapping domain 130b. The overlapping domain 130b includes layers 132a and 132b, and so forth.

For example, the layer 128a can include experiments that affect parameters related to ads, and the layer 128b can include experiments that affect parameters related to ranking. The domain 130a can include experiments that affect queries of a particular language, and the domain 130b can include experiments that affect queries for all other languages.

The system 100 is configured such that for each query allocated to a domain, the system determines whether there is an experiment in each layer in the domain that is eligible for diversion. Each query is subject to zero or more experiments in each of the layers 122a to 122c. The layer 122d has two domains 124a and 124b, in which a portion of the total traffic is subject to the non-overlapping domain 124a and the remaining portion of the total traffic is subject to the overlapping domain 124b. Traffic is allocated to the domain 124a does not overlap traffic allocated to the domain 124b.

The domain 124a includes one layer 126 having non-overlapping experiments. For each query allocated to the domain 124a, the system 100 determines whether the query should be diverted to one of the non-overlapping experiments 134. The domain 124b includes layers 128a to 128c. The layers 128a and 128b each has a single domain, so for every query allocated to the overlapping domain 124b, the system 100 determines whether the query should be diverted to zero or more of the experiments in each of the layers 128a and 128b. The layer 128c has two domains 130a and 130b. A portion of the traffic allocated to the domain 124b is allocated to the domain 130a, and the remaining portion of the traffic allocated to the domain 124b is allocated to the domain 130b.

The domain 130a includes one layer having non-overlapping experiments. For each query allocated to the domain 130a, the system 100 determines whether the query should be diverted to one of the non-overlapping experiments 136. The domain 130b includes layers 132a and 132c, etc. The layers 132a and 132b each has a single domain, so for every query allocated to the overlapping domain 130b, the system 100 determines whether the query should be diverted to zero or more of the experiments in each of the layers 132a and 132b, and so forth.

For the queries allocated to the overlapping domain 124b, the queries are diverted to each of the layers 128a, 128b, and 128c independently of each other. For the queries allocated to the overlapping domain 130b, the queries are diverted to each of the layers 132a and 132b, etc., independently of each other. Because the layers 132a and 132b are nested within the layer 128c, diversion of queries to the layers 132a and 132b is conditional of the diversion of queries to the layer 128c.

In general, for every query that is allocated to a particular non-overlapping domain, the system 100 determines whether the query should be diverted to zero or one of the experiments in the particular non-overlapping domain. For every query that is allocated to a particular overlapping domain having multiple layers, the system 100 determines whether the query should be diverted to zero or one of the experiments in each layer within the particular overlapping domain. For a group of overlapping layers, diversion of queries to one layer is independent of diversion of queries to the other layers in the group. If a layer is nested inside another layer, the diversion of queries to the nested layer is conditional of the diversion of queries to the outer layer.

In the example of FIG. 2C, because all of the traffic is subject to the layers 122a to 122c, and the layers 122a to 122c overlap the non-overlapping domain 124a and the overlapping domain 124b, the experiments in the layers 122a to 122c are useful for modifying parameter values that are used as default values in all the experiments. The launch layers can have a semantic meaning that is different from the other layers in the sense that the experiments in the launch layers can specify alternate default values, and experiments in the non-launch layers can override the default values. Experiments in different launch layers are configured so that they do not specify different default values for the same parameters, whereas experiments in the non-launch layers can override the default values (which can be the default values assigned by the system 100 prior to any experimentation or the default values modified by experiments in the launch layers).

New features being tested by the experiments in the layers 122a to 122c can be adjusted to gradually increase in percentage of search queries that are affected by new features (e.g., ramping up a launch of a new feature from 1% to 10% to 20% to 50% to 100% of traffic). Gradual launch of new features is useful for testing and load balancing, for example. By gradually launching the new features, the number of user queries affected by the new features gradually increases. If the new feature is problematic for every user query, the problems can be detected early on. If the new feature becomes problematic when traffic reaches a particular level, that particular level can be detected as the traffic subject to the experiment gradually increases, and load balancing techniques can be used to alleviate the problems. Because the layers 122a to 122c are useful in gradually launching the new features, the layers 122a to 122c are referred to as "launch layers." Detecting interactions between experiments in launch layers can be useful for understanding the cumulative impact of all of the new features being launched in order to make more informed decisions about the launches.

There can be any number of launch layers, including zero launch layers. For example, the first layer can include experiments related to color of an element and the second layer can include experiments related to the template of the element.

Within a given layer, some experiments can be cookie based experiments, and some experiments can be random traffic experiments. Experiments that divert independently of each other can be placed in different overlapping layers, e.g., 128a to 128c.

In some implementations, for random cookie experiments, one way to make different layers independent of one another is to use different cookie mod functions that are independent of one another for different layers. For example, one way to make the cookie mod function independent is to use a hash function based on the cookie and a unique layer identifier, e.g., f(cookie, layer) % 1000, where f( )) is the hash function.

It is possible to configure the experiment space to have any number of layers in a domain, and the diversion scheme does not necessarily have to use the hash of the cookie identifier and layer identifier described above. However, if there is not enough traffic, it may be difficult to properly detect N-way interactions (N>=2) among experiments in N different layers. When there is not enough traffic, it may also be difficult to detect the main effects that the experiments are trying to detect. Running overlapping experiments allows more experiments to be conducted for a given amount of traffic, as compared to running A/B testing.

The system 100 provides experiment flags, or parameters, that can be modified by experiments. Each binary has zero or more experiment flags, and the default values of the flags indicate how the binary will run in general. For example, the web server 102 may be associated with 500 or more flags. In some implementations, the system 100 stores default values for each flag (or parameter) for each application so that the default values for the parameters are used if the values are not overridden by experiments. The default values for the same flag can be different for different applications. Experiments are used to override the default values of the flags. The experiments inherit the default values of the flags that are not overridden.

For example, a first flag may control the background color for top ads on the search results page, a second flag may control the page template for the search result page, and a third flag indicates the value for a promotion threshold (the threshold at which ads are promoted above search results). Each flag has a default setting for each application. The default settings for the flags together indicate the default configuration for a running system. For example, the default value for the background color of the top ad can be blue. An experiment may change the value for the background color to be red, and the experiment runs on 10% of the traffic. Thus, the background color is red for 10% of the traffic and blue (default value) for the remaining 90% of the traffic.

Each of the web server 102, search results server 104, and ad results server 106, can be an application running on a server computer. Each application can be associated with a different set of experiment flags. For example, the web server 102 may have flags related to the display templates or the colors, for example, while the ad results server 106 may have flags related to the promotion threshold and disabling threshold for ads, for example. Multiple applications may be used to determine what actually shows up on the search results page provided by the search results server 104.

In the overlapping domain, diversion in each layer is independent of other layers. In order to partition the experiments into layers, the flags can be analyzed to find groups of flags that are independent of the one another. Each group of flags is placed in an individual layer. The same flag is not placed in more than one layer in the overlapping domain (but the same flag can be placed in a layer in the launch domain and in another layer in the overlapping domain). For example, diversion of traffic to experiments that adjust the color of a user interface element can be independent of diversion of traffic to experiments that change the template of the user interface. Thus, experiments that only affect the flag associated with the color can be placed in a layer that is separate from experiments that only affect the flag associated with the template. Because each flag or parameter is associated with a particular layer, one way to check whether an experiment is placed in the correct layer is to determine which flags the experiment is modifying and check whether the flags are associated with the layer.

When there are multiple domains (e.g., the experiment space can include one launch domain, multiple non-overlapping domains, and multiple overlapping domains), the same flag can be placed in more than one domain, but within only one layer in each domain. The launch layers (or launch domain) can have a partitioning that is different from the overlapping domain. If there are multiple overlapping domains, the layers in one overlapping domain can have a partitioning of experiment flags or parameters that is different from the partitioning of experiment flags or parameters in the other overlapping domains or the launch domain. Partitioning of the flags in one overlapping domain can be independent of the partitioning of the flags in other overlapping domains or the launch domain. The partitioning of flags in the layers of one overlapping domain do not need to be changed when layers in other overlapping domains or the launch domain are added or removed, or when the partitioning of flags in other overlapping domains or the launch domain is changed.

In some examples, the partitioning may be accomplished by analyzing a history of experiments to see which experiment flags commonly co-occur and thus can be placed in the same layer. The partitioning may take into account which flags do not overlap well. For example, one flag that controls text color and another flag that controls background color can be placed in the same layer, because even if there have been no historical experiments that use both flags simultaneously, it may not be good to have the text color be the same as the background color since that may lead to an unreadable web page.

In some examples, each experiment is associated with a configuration file. For example, the configuration file can include the name of the experiment, the identifier of the operator conducting the experiment, the contact information of the operator, flag values, configuration settings, and a control experiment identifier. An experiment's flag value can override the default value. The control experiment can be used as a reference for comparison.

The experiments in the launch layers (e.g., 122a-122c) can be seen as providing alternative default values. If no experiment overrides the default value of a parameter, the value from the launch layer becomes the default value. For example, the default value of a top ad may be blue. A launch layer experiment may indicate that 5% of the time, the default value is changed to green. An overlapping or non-overlapping experiment may change the top ad color to red. In this example, if not diverted to overlapping or non-overlapping experiments, the color of the top ad is blue 95% of the time and green 5% of the time. For the search queries that are diverted to the overlapping or non-overlapping experiments that adjust the top ad color, the top ad color is adjusted to red. The experiments in the overlapping domain or non-overlapping domain overrides the default value for the top ad color, regardless of whether the default value is blue or green.

For example, a cookie based experiment may specify that its fraction of traffic is 100%, and the cookie mods (i.e., remainders of performing modulo operations on cookie IDs) are 42 and 88. This means that every search query is tested to determine whether the remainder of cookie ID MOD (1000) is equal to 42 or 88 in which case the search query is diverted to the experiment.

For example, if a cookie based experiment specifies that its fraction of traffic is 3%, and the cookie mod is 34, then for each of the queries that satisfy ID MOD (1000)=34, a random number test is performed to select 3% of those queries. For example, a 100-sided die can be cast and if the die shows up as 1, 2, or 3, the query is diverted to the experiment.

Figure 3:
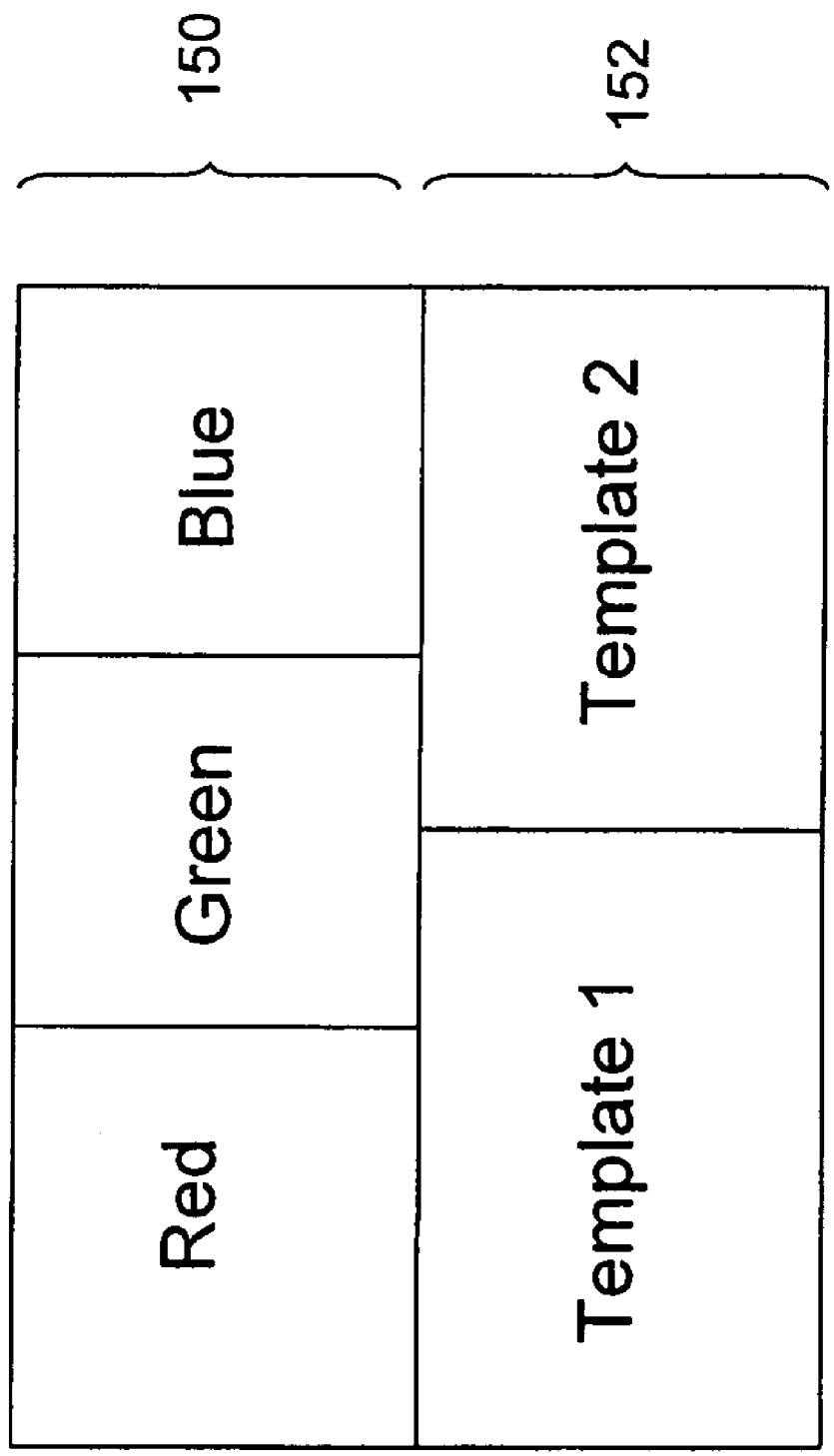

For example, suppose a user interface is associated with two parameters, color and template, that can be adjusted. We want to know the effects of changing the color to red, green, or blue, or changing the template to template 1 or template 2. Referring to FIG. 3, using the system 100 to perform overlapping experiments, five experiments are performed, and a person can conduct experiments on color without worrying about interactions with other experiments, such as the experiments related to templates. In this example, a flag for controlling color is assigned to a first layer 150 that is different from a second layer 152 to which a flag for controlling a template is assigned. The person conducting an experiment on color knows that the experiment will only affect a flag in the first layer 150 and will not affect flags in the second layer 152. The person only needs to make sure that the experiment does not affect two flags in the first layer 150, and does not need to know what flags are in the second layer 152. In this example, it is assumed that the effects of the experiments are compared with those of a control experiment in which, e.g., color=white and template=template 0.

In the example above, it is possible to conduct 5 non-overlapping experiments. In this case, ⅕ of the traffic is diverted to the experiment in which color=red, ⅕ of the traffic to color=green, ⅕ traffic to color=blue, ⅕ traffic to template=template 1, and ⅕ traffic to template=template 2. In the above example, when non-overlapping experiments are used, the amount of traffic diverted to each experiment is less than if overlapping experiments were used.

Using system 100 to perform overlapping experiments enables testing of new features of new products conveniently. Each time there is a new product that needs testing, a new property can be designed in an existing layer, or a new layer can be established. For example, if a service related to mobile devices is to be launched, and we want to adjust various parameters for the mobile services, we can create a new layer. If there are new services (e.g., a new map service, a new imaging service, a new news service, a new search service, and a new financial service) that need to be tested, a new layer can be established for each of the services. If an experiment affects a single flag in the new layer and does not affect flags in other layers, then the experiment can be placed in the overlapping domain 124b and overlap other experiments. If an experiment affects multiple flags in different layers, the experiment can be placed in the non-overlapping domain 124a.

When partitioning the layers, different layers can be configured to be independent of each other. If it is not clear whether experiments in different layers are truly independent of each other, one can perform a standard test or a paired analysis to see if parameters in two layers have any correlation or have any interaction with each other.

Figure 4:
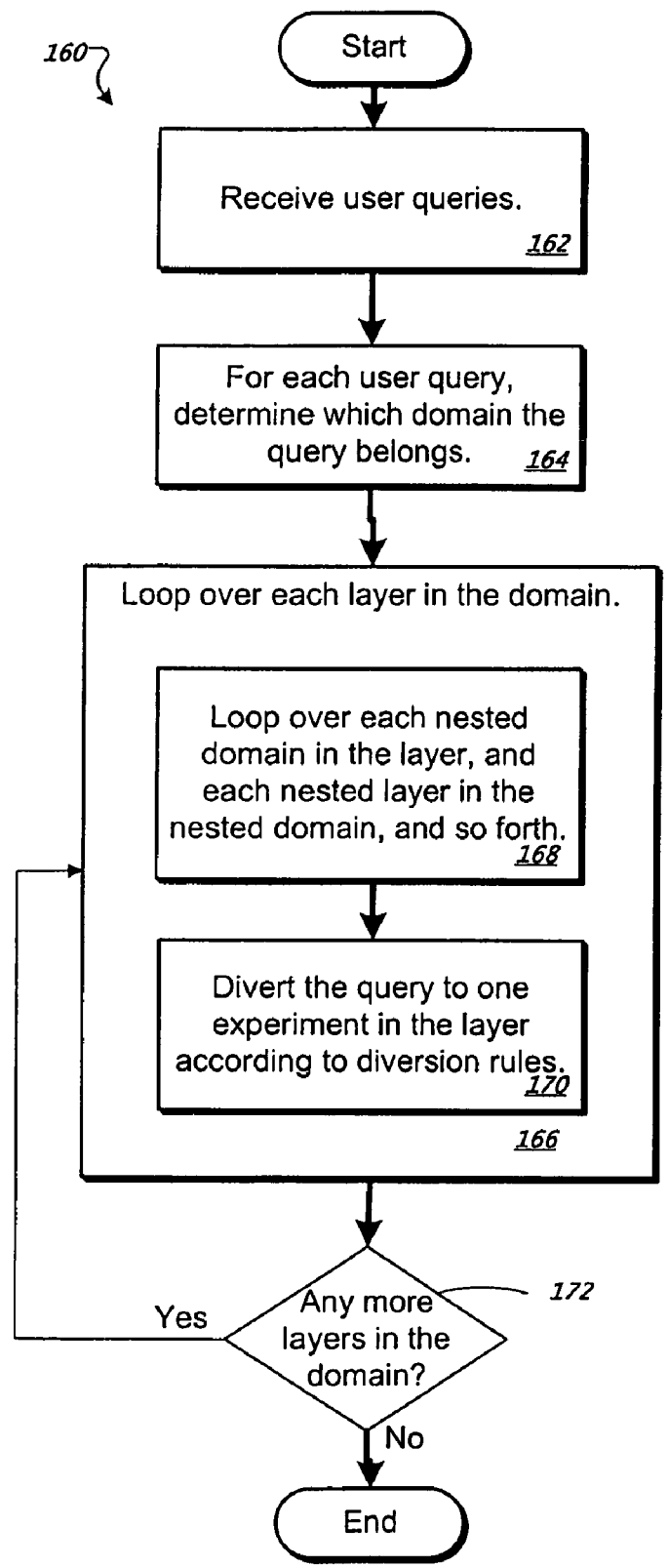
FIGS. 4 and 5 are flow diagrams of example processes for performing overlapping experiments.

FIG. 4 is a flow diagram of an example process 160 for performing overlapping experiments according to one or more configuration files that define an experiment structure having nested layers and domains. For example, the process 160 can be implemented by the system 100. A plurality of user queries are received (162), each query requesting a service from a server. For example, the user queries can be search queries requesting information related to query keywords.

In some implementations, domains can contain layers, and layers can contain domains or experiments. For each query, the process determines a domain to which the query belongs (164). The process 160 loops over all layers in the domain to which the query belongs (166). For each layer, the process 160 determines whether there is more than one nested domain in the layer. If there are more than one nested domain, the process 160 loops over each nested domain in the layer, and each nested layer, if any, in the nested domain, and so forth (168). For example, the domains can include a non-overlapping domain (e.g., 124a of FIG. 2) and an overlapping domain (e.g., 124b).

For each layer, the process 160 determines whether there is an experiment that should be applied to the query based on diversion rules and diverts the query to the experiment (170). For example, a query can be diverted to two or more experiments in different layers in which the diversion of queries in each layer is independent of the diversion of queries in other layers. The diversion of queries can be performed by the diversion libraries (e.g., 108a, 108b, 108c). For example, the queries can be diverted to experiments based on at least one of random or pseudo-random traffic or cookie identifiers associated with the queries. Diverting the queries to experiments can be based on outputs of a random number generator, hash values of the queries, or identifiers associated with user accounts.

In some implementations, the cookie-based experiments are determined first, then random traffic experiments are determined based on the non-biased traffic left over from the cookie-based experiments. In some implementations, additional diversion schemes may be supported, such as diversions based on user identifiers (which are linked to users) and cookie-day identifiers (which combine the cookie identifiers and the dates of the queries). For example, the experiments can be diverted based on user identifiers first, then cookie experiments are determined based on the non-biased traffic left over from the user-ID-based experiments. Cookie-day-based experiments are determined based on the non-biased traffic left over from the cookie-based experiments, then random traffic experiments are determined based on the non-biased traffic left over from the cookie-day-based experiments. This hierarchy is used because a single user identifier may be associated with multiple cookies, so the queries have to divert based on user identifiers first. A similar reasoning applies for diverting queries to cookie-based experiments before diverting to cookie-day-based experiments, and diverting queries to cookie-day-based experiments before diverting to random traffic experiments.

Each experiment modifies one or more parameters associated with the queries or parameters associated with processing of the queries. For example, there may be different layers of experiments that modify parameters related to user interfaces, to ranking of content, to advertisements, to matching of keywords, to maps, to news, to finance, to product search, to a personalized home page, to a non-personalized home page, and/or to mobile devices. Two or more experiments in different layers can be performed on the same query, but two experiments in the same layer are not performed on the same query.

If there are additional layers, the steps 166 to 170 are repeated. The process 160 determines whether all the layers have been processed (172). If all the layers in the domain have been processed, the process 160 ends.

The process 160 provides a way for diverting user queries to various experiments. After the experiments are conducted, one or more metrics can be evaluated to determine the effects of the experiments. For example, the metric can include revenue per specified number of impressions, click through rate, coverage, or ad depth. This allows an operator to perform experiments on many parameters in parallel and optimize the parameters in a short amount of time to enhance user experience.

The following are additional examples of metrics that can be used to evaluate the experiments:

Total number of queries (search result pages) diverted into an experiment.

Revenue earned per thousand queries.

The click-through rate for ads displayed at the top slot of a search results page. This rate is the percent of ad clicks in the top slot to ad impressions shown in the top slot.

The click-through rate for ads displayed at the right hand side slot of a search results page. This rate is the percent of ad clicks in the right hand side slot to ad impressions in the right hand side slot.

The fraction of queries for which one or more ad impressions are served. This is calculated as the number of matched queries (i.e., a query where at least one ad was served) divided by the number of queries.

The average number of ad impressions displayed per query, e.g., which can be the sum of the number of top ads divided by the number of queries and the number of right hand side ads divided by the number of queries.

The average number of ad impressions displayed at the top of the results page per query, which can be equal to the number of top ads divided by the number of queries.

The average number of ad impressions displayed on the right-hand side of the results page per query, which can be equal to the number of right hand side ads divided by the number of queries.

The revenue for all ad clicks in the experiment divided by the number of ad clicks.

The total number of queries divided by number of cookies.

Total number of first page searches divided by total number of cookies. A first page search is any search results page that is the first page of results, regardless of how the user got there (e.g., whether the user typed in the search manually or not).

The total number of visits divided by the number of cookies, in which a visit is defined as any sequence of actions that contain at least one web search that does not have an idle period of more than 30 minutes.

The total count of next page queries divided by the number of queries.

The number of first page abandoned queries divided by the number of first page queries. An abandoned query is a query that has no subsequent result (search or ads) clicks and does not have any subsequent refinements (manual or suggested).

The number of abandoned visits divided by the number of visits. An abandoned visit is a visit that ends with an abandoned query.

The number of queries with at least one click on a search result, or ad result divided by the total number of queries.

Time to first click, search, or ad, which is the mean of time elapsed between the query and the first click. Note that other actions (e.g., a next page) can occur between the query and the first click. Only calculated for queries that have at least one click.

Search click-through rate (CTR) by position. For example, the first search result may have CTR=a1, and the second search result may have CTR=a2.

Average click position. For example, if on average users click on the earlier search results more often, it means that the search results server has ranked the search results so that more relevant search results are ranked higher and placed earlier in the search results list.

Boolean query metrics. For example, the number of first page queries that have at least one ad click divided by the total number of first page queries, the number of first page queries that have at least one click on a result (e.g., ads, searches) divided by the total number of first page queries, and the number of first page queries that have at least one organic search result click divided by the total number of first page queries.

Boolean visit metrics. For example, the number of visits that have at least one click on a result (e.g., ad or search result) divided by the total number of visits, the number of visits that have at least one search result click divided by the total number of visits, and the number of visits that have at least one ad click) divided by the total number of visits.

In some implementations, the diversion of a query to experiments within a layer subject to eligibility conditions can be performed as follows (the same applies for additional layers):

Step 1: The diversion types and eligibility conditions of the experiments are configured in a data file.

Step 2: For each experiment that specifies the diversion type to be based on user ID mod values, the query is examined to determine whether it (a) passes a user identifier mod check specified by the experiment (e.g., whether the user ID mod is equal to a particular value), and (b) passes the eligibility criteria specified by the experiment (e.g., the user query is associated with a particular language or browser type).

If the query passes (a) and (b), the query is diverted into the experiment. If it passes (a) but not (b), the query is considered to be biased traffic and is not passed further onto steps 3 to 5 below. Otherwise, if the query fails both (a) and (b), the query is further processed according to steps 3 to 5.

Note that there may not be eligibility criteria on all experiments. If an experiment only specifies a user ID mod value without specifying eligibility criteria, then the query passes check (b) since the check is basically take all traffic. Multiple experiments can share the same mod value if they have non-overlapping eligibility constraints, e.g., an experiment with a filter hook for the English language can share the same mod value as an experiment with a filter hook for the German language.

Step 3: For each experiment that specifies the diversion type to be based on cookie ID mod values, the query is examined to determine whether it (a) passes the cookie id mod check specified by the experiment, and (b) passes the eligibility criteria specified by the experiment (note that not all experiments have additional eligibility criteria, so the query passes (b) by default for experiments that do not specify any eligibility criteria).

If the query passes (a) and (b), the query is diverted to the experiment. If the query only passes (a) but not (b), the query is considered biased and not passed onto the later steps 4 and 5. If the query fails both (a) and (b), the query is further processed according steps 4 and 5.

Step 4: For each experiment that specifies the diversion type to be based on cookie-day mod values, the query is examined to determine whether it (a) passes the cookie-day mod check specified by the experiment, and (b) passes the eligibility criteria specified by the experiment (note that not all experiments have additional eligibility criteria, so the query passes (b) by default for experiments that do not specify any eligibility criteria).

If the query passes (a) and (b), the query is diverted to the experiment. If the query only passes (a) but not (b), the query is considered biased and not passed onto the later step 5. If the query fails both (a) and (b), the query is further processed according step 5.

Step 5: For each experiment that specifies the diversion type to be based on random traffic, the query is examined to determine whether it (a) passes the random value check specified by the experiment, and (b) passes the eligibility criteria specified by the experiment (note that not all experiments have additional eligibility criteria, so the query passes (b) by default for experiments that do not specify any eligibility criteria). If the query passes (a) and (b), the query is diverted to the experiment.

This way, queries can be diverted to experiments within the same layer using different diversion types (e.g., diversion based on user ID, cookie, cookie-day, or random traffic) by having a strict ordering of the diversion types. The experiments can optionally specify additional eligibility criteria to allow better sharing of traffic and so that each experiment can be applied only to the traffic that the experiment actually impacts.

Figure 5:
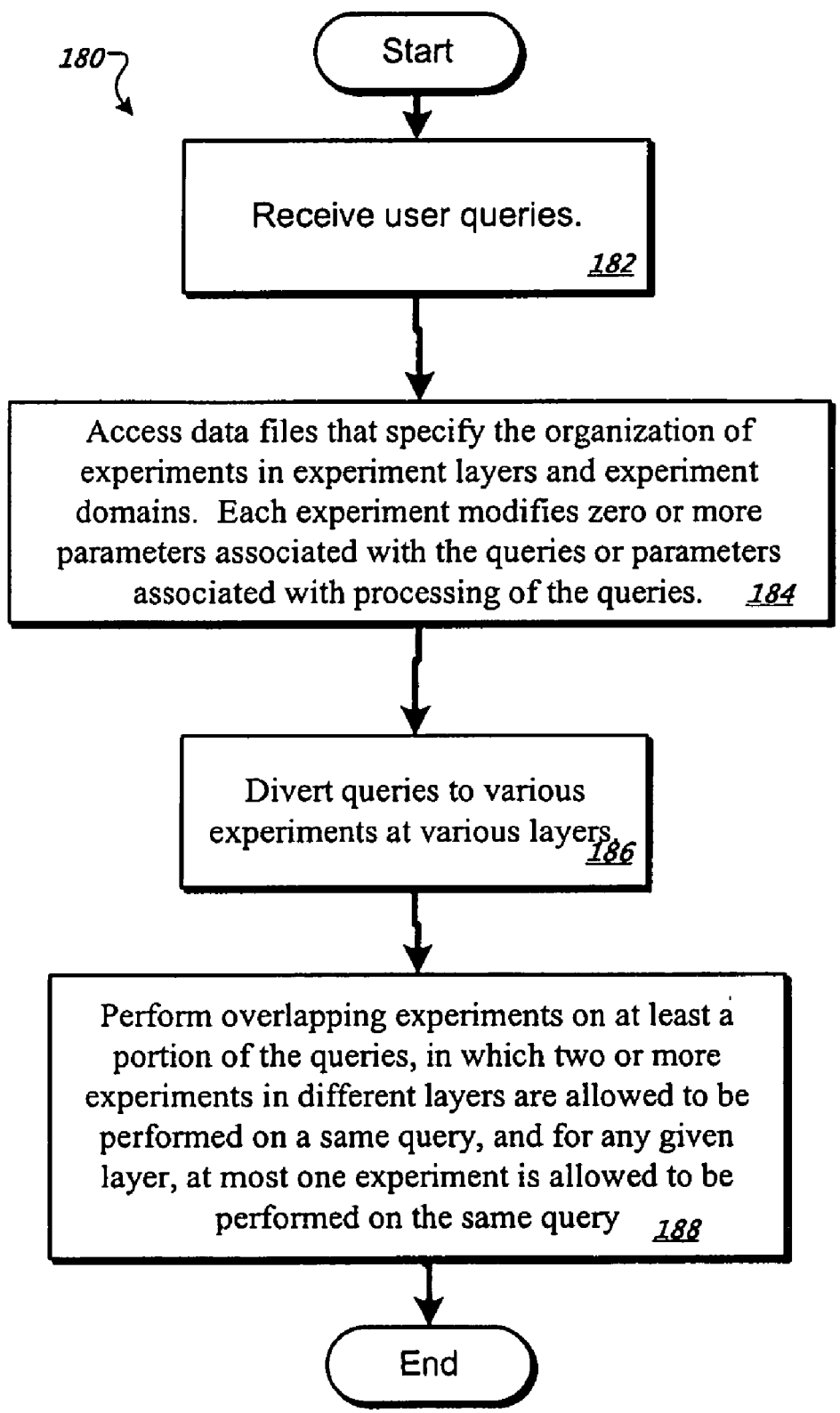

FIG. 5 is a flow diagram of another example process 180 for performing overlapping experiments. For example, the process 180 can be implemented by the system 100 of FIG. 1. In the process 180, a plurality of user queries are received, each query requesting a service from a server (182). For example, the server can be the search results server 104. The user queries can include search queries each associated with one or more query keywords, map queries each associated with at least one geographical location, news queries each associated with at least one news event, or any combination of the above.

Data files are accessed, in which the data files specify the organization of experiments in experiment layers and experiment domains (184). Each experiment modifies zero or more parameters associated with the queries or parameters associated with processing of the queries. For example, the parameters can include a group of parameters related to user interfaces, a group of parameters related to ranking of search results, a group of parameters related to advertisements, a group of parameters related to matching of keywords, a group of parameters related to maps, a group of parameters related to news, a group of parameters related to mobile devices, or any combination of the above.

The queries are diverted to various experiments at various layers (186). For example, the queries can be diverted to the experiments according to diversion rules. Some queries are each diverted to two or more experiments in different layers, in which the diversion of queries in each layer is independent of the diversion of queries in other layers. For example, a portion of the queries can be diverted to experiments based on random or pseudo-random traffic or cookie identifiers associated with the queries. For example, diverting a portion of the queries to experiments based on random traffic can be achieved by diverting the queries based on outputs of a random number generator or hash values of the queries. For example, a portion of the queries can be diverted to experiments related to user interfaces based on cookie identifiers associated with the queries.

Overlapping experiments are performed on at least a portion of the queries, in which two or more experiments in different layers are allowed to be performed on a same query, and for any given layer, at most one experiment is allowed to be performed on the same query (188).

For example, after the overlapping experiments are performed, one or more metrics can be evaluated to determine the effects of the experiments. For example, the metrics can include the number of queries diverted into an experiment, revenue per specified number of impressions, click through rate, a fraction of queries for which one or more ad impressions are served, an average number of ad impressions displayed per query, revenue for ad clicks divided by a number of ad clicks, a number of queries divided by a number of cookies, a number of first page searches divided by a number of cookies, a number of visits divided by a number of cookies, a count of next page queries divided by a number of queries, a number of first page abandoned queries divided by a number of first page queries, a number of abandoned visits divided by a number of visits, a number of queries with at least one click on a search result or ad result divided by a number of queries, a time period between a query and a first click, search click through rate by position, an average click position. The metrics can include Boolean query metrics, such as the number of queries that have at least one ad click divided by the total number of (first page) queries, the number of queries that have at least one click on a result (e.g., ads, searches) divided by the total number of (first page) queries, or the number of queries that have at least one organic search result click divided by the total number of (first page) queries. The metrics can include Boolean visit metrics, such as the number of visits that have at least one click on a result (e.g., ads, search) divided by the total number of visits, visits that have at least one search result click divided by the total number of visits, visits that have at least one ad click divided by the total number of visits.

Figure 6:
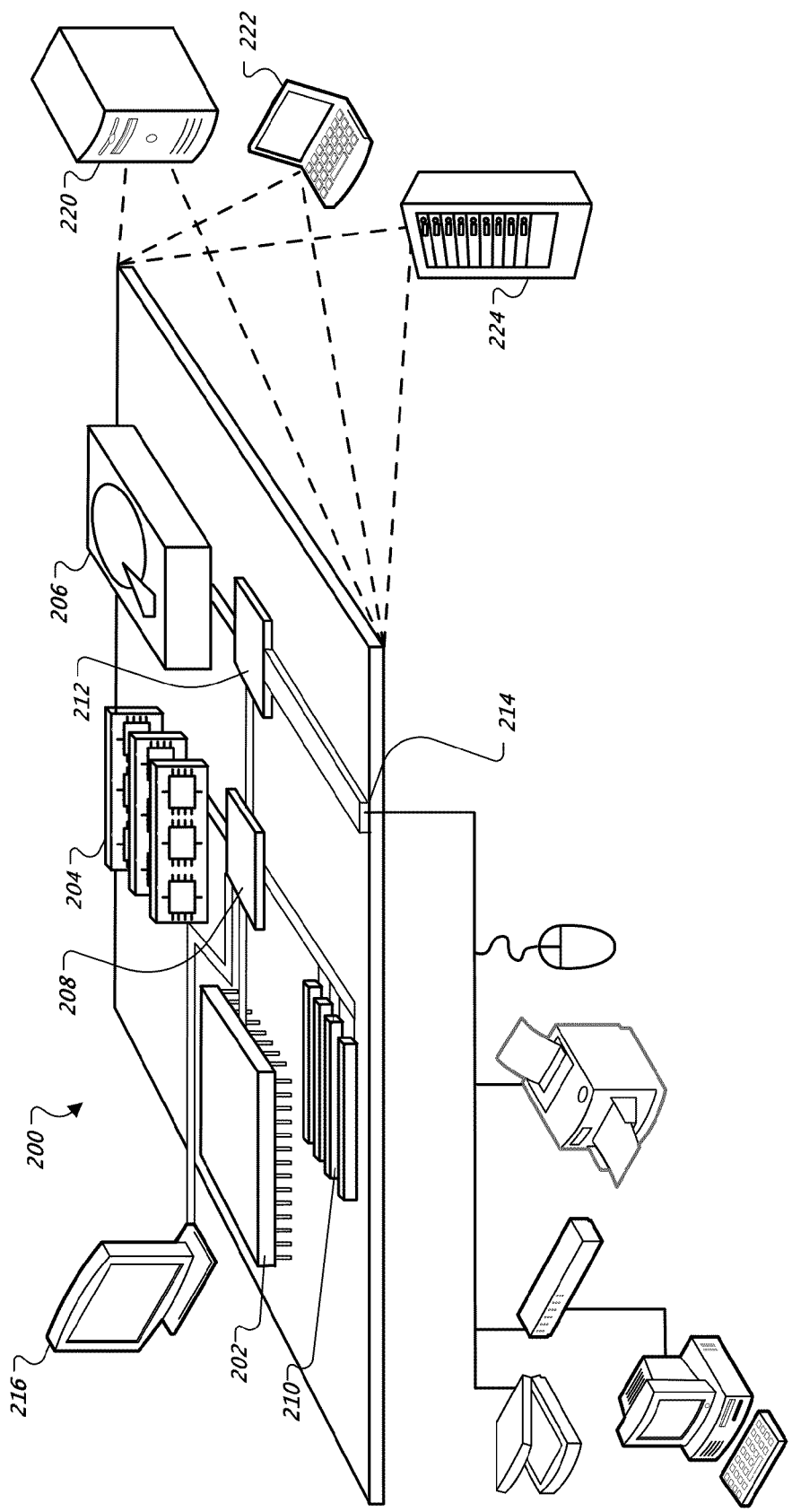
FIG. 6 is a schematic representation of a general computing system.

FIG. 6 is a schematic representation of a general computing system 200 that can be used to implement the system 100. Computing device 200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 200 includes a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, are interconnected using various busses, and may be mounted on a common motherboard or in other manners as appropriate. The processor 202 can process instructions for execution within the computing device 200, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

The memory 204 stores information within the computing device 200. In one implementation, the memory 204 is a volatile memory unit or units. In another implementation, the memory 204 is a non-volatile memory unit or units. The memory 204 may also be another form of computer-readable medium, such as a magnetic or optical disk.

The storage device 206 is capable of providing mass storage for the computing device 200. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

The high speed controller 208 manages bandwidth-intensive operations for the computing device 200, while the low speed controller 212 manages lower bandwidth-intensive operations. Such allocation of functions is exemplary only. In one implementation, the high-speed controller 208 is coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 200 may be implemented in a number of different forms, as shown in the figure. For example, it may be implemented as a standard server 220, or multiple times in a group of such servers. It may also be implemented as part of a rack server system 224. In addition, it may be implemented in a personal computer such as a laptop computer 222. Each of such devices (e.g., standard server, rack server system, personal computer, laptop computer) may contain one or more of computing device 200, and an entire system may be made up of multiple computing devices 200 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated.

For example, the effects of an experiment do not necessarily have to be compared with those of controlled experiments (i.e., experiments using default parameter values). It is possible that there are no default values for certain parameters (there may be situations in which there is no natural definition of default, e.g., because the default keeps changing as new features are launched), and the effects of the experiments are evaluated using statistical analyses. In some examples, multiple parameter settings can be compared simultaneously to determine the effects of experiments. The systems subject to experimentation can be linear or non-linear. The system 100 may allow null experiments to be executed, which do not change any parameter.

In the example of FIG. 2B, the default domain 140 includes four layers 122a, 122b, 122c, and 122d. The experiment structure can also be organized such that the default domain 140 includes nested domains, such as a launch domain, a non-overlapping domain, and an overlapping domain. The launch domain includes the launch layers 122a, 122b, and 122c, and the layer 122d can be removed.

For example, the experiment flag may include an extension to allow triggering of a particular experiment flag on a specific set of machines. This is useful when, for example, an operator is testing new code and only wants to execute the code on a limited number of machines to limit the damage that may occur if the machines crash to prevent loss of data at multiple data centers. Special flags can be used in which the special flags can be overridden by experiments in different layers in a cooperative fashion. For example, the promotion threshold may have different subcomponents that are merged together and experiments in different layers can override these different subcomponents without affecting the other ones or how the subcomponents are merged together. A special flag can have a tree structure in which each layer can modify non-overlapping parts of the tree, where a node of the tree specifies a value and a way of merging sub-trees onto that value. The diversion library can add functionality for experiment statistics tracking, disabling, and monitoring, in order to keep track of errors seen by experiments and to disable units that have errors. The diversion library can have auto-throttling logic so that certain experiments (e.g., some beta experiments that are highly popular) do not receive too much traffic.

There can be many types of experimental flags. Below are few examples. For example, a flag can represent a minimum threshold needed for an ad to be promoted. A flag can represent a maximum number of ads that can be promoted in response to a search query. A flag can be used to determine whether information about experiments should be logged to facilitate debugging (e.g., experiments are logged when the flag is set to true and not logged when the flag is set to false). A flag (by setting it to true or false) can be used to determine whether ad clicks should be redirected to a new ad-click-server instead of a default web server. A flag can represent the background color for top ads template, or the vertical line color for right hand side ads. A flag can be used to select a template for a results navigation bar, a template for a web search page header, a template to use for a header of a results page, a template for a company logo in a web result page search form, or a template for a search box. A flag can be used to select whether to show an advanced search link beside a top search box, whether to show a preferences link beside the top search box. A flag can be used to represent a descriptor for a homepage template group, a descriptor for a homepage footer template group, a descriptor for a homepage header template, a descriptor for a search result page template, a descriptor for a template around the search results, descriptor for the search form template, or a descriptor for no results help template. A flag can be used to select a homepage tabs template. A flag can be used to represent a search results page company logo, a results page company logo height, a results page company logo width, a background color to use with maps ads. A flag can be used to select whether to show featured content on a home panel. A flag can be used to represent the number of right hand side ads to request, or the number of top ads to request. A flag can be used to determine whether local information relevant to the user query is displayed at the top of the search results, whether a map relevant to the user query is displayed at the top of the search results, or whether links to news articles relevant to the user query are displayed at the top of the search results.

A flag can be used to determine whether to send a request to get spelling corrections. A flag can represent the standard width of the search box, in which setting the flag value to 0 will result in using the default value. A flag can represent a maximum amount of space a search box can use.

In some implementations, flags can specify a list of modifiers, each possibly keyed on multiple conditions, in which the conditions for a modifier have to be met for the modifier to become effective. The conditions can be arbitrary functions registered in the code, capable of performing custom processing using the arguments specified by the flag, as well as the state of the query. Query state can be passed in via, e.g., an ExperimentState object. A flag lookup call does not need to pass in any key values. Instead, anything in ExperimentState can be used to compute the conditions, and hence the flag value. Because the conditions are arbitrary functions, any information needed to compute them are logged separately.

A protocol message describing the flag can be restructured as follows. Flags can start with a single typed value, and modifiers can be applied on top of this value. The modifiers can have multiple pre-conditions for triggering the flag, and can provide a value that is merged into the current value using a specified operator. The modifiers can allow arbitrary nesting to be able to specify expressions involving multiple operators. Names can be assigned to modifiers. The named modifiers can be referred to later, e.g., for only overriding the single modifier in an experiment, or for reusing the modifier in a complicated expression that needs to repeatedly refer to a sub-expression. The experiment code can be smart enough to cache the values of flags when it can. The conditions can register whether they are immutable during the life of the query, or not. If all conditions used for a flag are immutable, the value of the flag is cached.

In addition to performing experiments on user search queries, the experiments can be applied to syndicated content. For example, a section of a website can be made available for other sites to use, and portions of the website are varied over time according to overlapping experiments. For example, targeted ads can be inserted into information in a syndicated, e.g., RSS (really simple syndication), presentation format, and the overlapping experiments can be used to optimize parameters associated with the syndicated content to increase, e.g., conversion rate. When users subscribe to web feeds, such as RSS or Atom feeds, overlapping experiments can be performed to vary parameters associated with the web feeds over time, and the effects of those changes can be evaluated.

The experiments can be applied to messages other than user queries. For example, when users visit a homepage of a web site, the homepage views can be subject to experiments. For example, some users who visit the homepage are subject to an experiment, other users who visit the home page are not subject to the experiment, and one or more metrics can be evaluated to determine how the experiment affects the people who visit the home page. Similarly, experiments may be applied to visits to news pages, help pages, or other portal pages that provide services or information to users. The diagrams in FIGS. 1, 2A, 2B, 4, and 5 are directed to experiments on queries, but the same principles can also be applied to experiments on visits to homepages, news pages, help pages, and other portal pages, etc., or other types of experiments.

The web server 102, search results server 104, and the ad results server 106 can be implemented in one server computer that executes a binary for providing web services, a binary for providing search services, and a binary for providing ad services. There can be multiple instances of each component shown in the figures, such as multiple web servers 102, search servers 104, and ad results servers 106. In some experiment systems, each layer has one or more experiments, in which an experiment can be a null experiment that does not modify any parameter. In some implementations, the experiments in different overlapping layers can override the same parameter(s), and the values of the parameter(s) can be merged in a predefined manner or according to certain logic.

In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving a plurality of user queries;
accessing at least first and second experiments associated with a plurality of parameters, with the first experiment being different from the second experiment, with the first experiment for adjusting a first value of a first parameter associated with processing one of the received user queries, with the second experiment for adjusting a second value of a second parameter associated with processing the one of the received user queries, and with the first parameter being different from the second parameter;

grouping at least the first and second experiments into a domain selected from two or more domains, wherein:
the domain comprises at least a first layer and a second layer, the first layer comprising at least the first experiment and the second layer comprising at least the second experiment;
the domain further comprises a launch layer for generating a first default value for the first parameter of the first experiment and a second default value for the second parameter of the second experiment; and
at most one experiment from the first layer and at most one experiment from the second layer is allowed to be performed on the one of the received user queries; and
selecting, from the first layer, the first experiment;
selecting, from the second layer, the second experiment; and
performing the first and the second experiments on the one of the received user queries.

2. The method of claim 1, further comprising diverting the plurality of user queries to one or more experiments in the first layer and the second layer.

3. The method of claim 2, further comprising:
applying one or more eligibility conditions to the first experiment; and
determining, based on applying, whether to apply the first experiment to queries diverted to the first layer.

4. The method of claim 1, further comprising:
partitioning the plurality of parameters into sets of parameters such that different sets of parameters are independent of each other; and
associating different sets of parameters with different layers in the domain.

5. The method of claim 1, further comprising placing the first experiment in the first layer.

6. The method of claim 4, wherein the domain comprises a first domain and wherein parameters partitioned into the first domain are independent from parameters partitioned into a second domain.

7. The method of claim 1, wherein parameters in the second layer are independent of one another.

8. The method of claim 1, further comprising diverting a portion of the plurality of user queries to experiments based on at least one of random traffic, pseudo-random traffic, user identifiers associated with the plurality of user queries, cookie identifiers associated with the plurality of user queries, or a combination of cookie identifiers and date information associated with the plurality of user queries.

9. The method of claim 8, wherein diverting the portion of the plurality of user queries comprises diverting user queries associated with user identifiers before diverting user queries associated with cookie identifiers or random values.

10. The method of claim 8, wherein diverting the portion of the plurality of user queries to experiments based on random traffic comprises diverting user queries based on at least one of (i) outputs of a random number generator, or (ii) hash values of the user queries.

11. The method of claim 8, wherein diverting the portion of the user queries to experiments based on cookie identifiers associated with the user queries comprises diverting user queries to experiments related to user interfaces based on the cookie identifiers associated with the user queries.

12. The method of claim 1, wherein the first default value of the first parameter differs from the second default value of the second parameter that is generated by the launch layer.

13. The method of claim 1, wherein the first experiment in the first layer and an experiment in the launch layer are allowed to modify the value of the parameter of the first experiment.

14. The method of claim 1, wherein the first layer and the second layer are overlapping layers.

15. The method of claim 1, wherein the first layer is associated with the launch layer.

16. The method of claim 14, further comprising:
partitioning parameters associated with the overlapping layers; and
partitioning parameters associated with the launch layer;
wherein the partitioning of the parameters associated with the overlapping layers is independent of the partitioning of the parameters associated with the launch layer.

17. The method of claim 1, wherein one or more of the first layer and the second layer comprise at least one of:
a layer of experiments that modify parameters related to user interfaces;
a layer of experiments that modify parameters related to ranking of content;
a layer of experiments that modify parameters related to advertisements;
a layer of experiments that modify parameters related to matching of keywords
a layer of experiments that modify parameters related to maps;
a layer of experiments that modify parameters related to news;
a layer of experiments that modify parameters related to finance;
a layer of experiments that modify parameters related to product search;
a layer of experiments that modify parameters related to a personalized home page;
a layer of experiments that modify parameters related to a non-personalized home page; or
a layer of experiments that modify parameters related to mobile devices.

18. The method of claim 1, further comprising evaluating one or more metrics to determine effects of one or more of the first experiment and the second experiment.

19. The method of claim 1, further comprising evaluating a metric after conducting one or more of the first experiment and the second experiment, the metric comprising at least one of:
a number of queries diverted into one or more of the first experiment and the second experiment;
revenue per specified number of impressions;
click through rate;
a fraction of queries for which one or more ad impressions are served;
an average number of ad impressions displayed per query;
revenue for ad clicks divided by a number of ad clicks;
a number of queries divided by a number of cookies;
a number of page searches divided by a number of cookies;
a number of visits divided by a number of cookies;
a count of next page queries divided by a number of queries;
a number of page abandoned queries divided by a number of page queries;
a number of abandoned visits divided by a number of visits;
a number of queries with at least one click on a search result or ad result divided by a number of queries;
a time period between a query and a click;
search click through rate by position;
average click position;

a number of queries that have at least one ad click divided by a total number of queries;
a number of queries that have at least one click on a result divided by a total number of queries, the result comprising an ad or a search result;
a number of queries that have at least one click on an organic search result divided by a total number of queries;
a number of visits that have at least one click on a result divided by a total number of visits, the result comprising an ad or a search result;
a number of visits that have at least one search result click divided by a total number of visits; or
a number of visits that have at least one ad click divided by a total number of visits.

20. The method of claim 1, further comprising detecting an interaction between experiments in different layers.

21. The method of claim 1, wherein the plurality of user queries comprise at least one of search queries associated with one or more query keywords, map queries associated with at least one geographical location, news queries associated with at least one news event, queries associated with information on finance, search queries associated with products, queries each associated with a non-personalized home page, and queries associated with a personalized home page.

22. The method of claim 21, wherein the plurality of parameters comprise at least one of:
a group of parameters related to user interfaces;
a group of parameters related to ranking of search results;
a group of parameters related to advertisements;
a group of parameters related to matching of keywords;
a group of parameters related to maps,
a group of parameters related to news;
a group of parameters related to finance;
a group of parameters related to product search;
a group of parameters related to a personalized home page;
a group of parameters related to a non-personalized home page; or
a group of parameters related to mobile devices.

23. The method of claim 1, further comprising providing an analysis of the first and second experiments to a computing device for display.

24. The method of claim 1, wherein the first experiment is performed on a first computing device and the second experiment is performed on a second, different computing device.

25. A non-transitory computer-readable medium configured to store instructions that are executable by a computer to perform operation comprising:
receiving a plurality of user queries;
accessing at least first and second experiments associated with a plurality of parameters, with the first experiment being different from the second experiment, with the first experiment for adjusting a first value of a first parameter associated with processing one of the received user queries, with the second experiment for adjusting a second value of a second parameter associated with processing the one of the received user queries, and with the first parameter being different from the second parameter;
grouping at least the first and second experiments into a domain selected from two or more domains, wherein:
the domain comprises at least a first layer and a second layer, the first layer comprising at least the first experiment and the second layer comprising at least the second experiment;
the domain further comprises a launch layer for generating a first default value for the first parameter of the first experiment and a second default value for the second parameter of the second experiment; and
at most one experiment from the first layer and at most one experiment from the second layer is allowed to be performed on the one of the received user queries; and
selecting, from the first layer, the first experiment;
selecting, from the second layer, the second experiment; and
performing the first and the second experiments on the one of the received user queries.

26. The non-transitory computer-readable medium of claim 25, wherein the operations further comprise diverting the plurality of user queries to one or more experiments in the first layer and the second layer.

27. The non-transitory computer-readable medium of claim 26, wherein the operations further comprise:
applying one or more eligibility conditions to the first experiment; and
determining, based on applying whether to apply the first experiment to queries diverted to the first layer.

28. The non-transitory computer-readable medium of claim 25, wherein the operations further comprise:
partitioning the plurality of parameters into sets of parameters such that different sets of parameters are independent of each other; and
associating different sets of parameters with different layers in the domain.

29. The non-transitory computer-readable medium of claim 25, wherein the operations further comprise: placing the first experiment in the first layer.

30. The non-transitory computer-readable medium of claim 25, wherein parameters in the second layer are independent of one another.

31. The non-transitory computer-readable medium of claim 25, wherein the operations further comprise:
diverting a portion of the plurality of user queries to experiments based on at least one of random traffic, pseudorandom traffic, user identifiers associated with the plurality of user queries, cookie identifiers associated with the plurality of user queries, or a combination of cookie identifiers and date information associated with the plurality of user queries.

32. The non-transitory computer-readable medium of claim 25, wherein the operations further comprise: evaluating one or more metrics to determine effects of one or more of the first experiment and the second experiment.

33. The non-transitory computer-readable medium of claim 25, wherein the operations further comprise: detecting an interaction between experiments in different layers.

34. The non-transitory computer-readable medium of claim 25, wherein the operations further comprise: providing an analysis of the first and second experiments to a computing device for display.

35. A system comprising:
one or more processing devices; an
one or more machine-readable media configured to store instructions that are executable by the one or more processing devices to perform operations comprising:
receiving a plurality of user queries;
accessing at least first and second experiments associated with a plurality of parameters, with the first experiment being different from the second experiment, with the first experiment for adjusting a first value of a first parameter associated with processing one of the received user queries, with the second experiment for adjusting a second value of a second parameter associated with processing the one of the received user queries, and with the first parameter being different from the second parameter;

grouping at least the first and second experiments into a domain selected from two or more domains, wherein:
- the domain comprises at least a first layer and a second layer, the first layer comprising at least the first experiment and the second layer comprising at least the second experiment;
- the domain further comprises a launch layer for generating a first default value for the first parameter of the first experiment and a second default value for the second parameter of the second experiment; and
- at most one experiment from the first layer and at most one experiment from the second layer is allowed to be performed on the one of the received user queries; and selecting, from the first layer, the first experiment;

selecting, from the second layer, the second experiment; and performing the first and the second-experiments on the one of the received user queries.

36. The system of claim 35, wherein the operations further comprise diverting the plurality of user queries to one or more experiments in the first layer and the second layer.

37. The system of claim 36, wherein the operations further comprise:
- applying one or more eligibility conditions to the first experiment; and
- determining, based on applying, whether to apply the first experiment to queries diverted to the first layer.

38. The system of claim 36, wherein the operations further comprise:
- partitioning the plurality of parameters into sets of parameters such that different sets of parameters are independent of each other; and
- associating different sets of parameters with different layers in the domain.

39. The system of claim 36, wherein the operations further comprise: placing the first experiment in the first layer.

40. The system of claim 36, wherein parameters in the second layer are independent of one another.

41. The system of claim 36, wherein the operations further comprise:
- diverting a portion of the plurality of user queries to experiments based on at least one of random traffic, pseudo-random traffic, user identifiers associated with the plurality of user queries, cookie identifiers associated with the plurality of user queries, or a combination of cookie identifiers and date information associated with the plurality of user queries.

42. The system of claim 36, wherein the operations further comprise:
- evaluating one or more metrics to determine effects of one or more of the first experiment and the second experiment.

43. The system of claim 36, wherein the operations further comprise:
- detecting an interaction between experiments in different layers.

44. The system of claim 36, wherein the operations further comprise:
- providing an analysis of the first and second experiments to a computing device for display.

* * * * *

UNITED STATES PATENT AND TRADEMARK OFFICE
CERTIFICATE OF CORRECTION

| | | |
|---|---|---|
| PATENT NO. | : 8,090,703 B1 | |
| APPLICATION NO. | : 12/367437 | |
| DATED | : January 3, 2012 | |
| INVENTOR(S) | : Ashish Agarwal et al. | |

It is certified that error appears in the above-identified patent and that said Letters Patent is hereby corrected as shown below:

Col. 32 line 25
In Claim 17, delete "keywords" and insert -- keywords; --, therefor.

Col. 33 line 32
In Claim 22, delete "maps," and insert -- maps; --, therefor.

Col. 34 line 55
In Claim 35, delete "an" and insert -- and --, therefor.

Signed and Sealed this
Sixth Day of March, 2012

David J. Kappos
*Director of the United States Patent and Trademark Office*